US011639286B2

(12) United States Patent
O'Connell et al.

(10) Patent No.: US 11,639,286 B2
(45) Date of Patent: May 2, 2023

(54) SCISSOR LIFT CART AND VARIABLE PITCH CARRYING SYSTEM

(71) Applicant: RESCUE 42, INC., Chico, CA (US)

(72) Inventors: Timothy O'Connell, Chico, CA (US); Brian Fredenberg, Chico, CA (US); Fatehali Dharssi, Vancouver (CA)

(73) Assignee: RESCUE 42, INC., Chico, CA (US)

( * ) Notice: Subject to any disclaimer, the term of this patent is extended or adjusted under 35 U.S.C. 154(b) by 564 days.

(21) Appl. No.: 16/789,705

(22) Filed: Feb. 13, 2020

(65) Prior Publication Data
US 2020/0255271 A1 Aug. 13, 2020

Related U.S. Application Data

(63) Continuation of application No. PCT/US2018/046821, filed on Aug. 16, 2018.

(60) Provisional application No. 62/547,087, filed on Aug. 17, 2017.

(51) Int. Cl.
B66F 7/28 (2006.01)
B66F 7/06 (2006.01)
B60R 9/06 (2006.01)
B62B 5/00 (2006.01)

(52) U.S. Cl.
CPC .............. B66F 7/28 (2013.01); B60R 9/06 (2013.01); B62B 5/0003 (2013.01); B66F 7/065 (2013.01)

(58) Field of Classification Search
CPC .............................. B62B 5/0003; B66F 7/065
See application file for complete search history.

(56) References Cited

U.S. PATENT DOCUMENTS

| 5,738,261 | A | * | 4/1998 | Dula | B60R 9/06 |
| | | | | | 280/495 |
| 8,113,479 | B1 | | 2/2012 | O'Connell | |
| 9,375,986 | B1 | * | 6/2016 | Dykstra | B62B 1/00 |
| 10,040,326 | B1 | | 8/2018 | O'Connell | |
| 10,065,566 | B1 | * | 9/2018 | Harbaugh | B60D 1/46 |
| 10,780,907 | B1 | * | 9/2020 | Camarco | B62B 5/0003 |
| 2004/0178589 | A1 | | 9/2004 | Grauss | |

(Continued)

FOREIGN PATENT DOCUMENTS

| KR | 200479418 Y1 | 1/2016 |
| WO | 2018035176 A1 | 2/2018 |
| WO | 2019036547 | 2/2019 |

OTHER PUBLICATIONS

ISA/KR, Korean Intellectual Property Office (KIPO), International Search Report and Written Opinion dated Jan. 24, 2019, related PCT international application No. PCT/US2018/046821, pp. 1-13, claims searched, pp. 14-23.

Primary Examiner — Brian L Swenson
(74) Attorney, Agent, or Firm — O'Banion & Ritchey LLP; John P. O'Banion

(57) ABSTRACT

A motor vehicle receiver hitch adapter with associated wheeled scissor lift cargo cart and mounted payloads. The hitch adapter comprises a variable pitch control system for mounting a cargo cart and attached payload in which the scissor lift mechanism within the cart is also capable of compressive force to power a dynamic pitch control system. The cargo cart also incorporates a restraint system to prevent carrying vehicle damage, and a vibration dampening system to protect carried payloads.

28 Claims, 19 Drawing Sheets

(56) References Cited

U.S. PATENT DOCUMENTS

| | | |
|---|---|---|
| 2005/0173878 A1* | 8/2005 | Espejo .................... B62B 3/027 |
| | | 280/47.34 |
| 2008/0100076 A1 | 5/2008 | Potts |
| 2009/0146394 A1* | 6/2009 | Seivert ................. B62B 5/0003 |
| | | 280/504 |
| 2009/0232633 A1* | 9/2009 | Stamps .................... B66F 7/08 |
| | | 280/423.1 |
| 2014/0375040 A1 | 12/2014 | Rhodes |
| 2016/0272229 A1* | 9/2016 | Buckner .................. B62B 3/02 |
| 2017/0001573 A1 | 1/2017 | Inagaki |
| 2019/0248633 A1 | 8/2019 | O'Connell |

\* cited by examiner

SCISSOR LIFT CART AND VARIABLE PITCH CARRYING SYSTEM

CROSS-REFERENCE TO RELATED APPLICATIONS

This application claims priority to, and is a 35 U.S.C. § 111(a) continuation of, PCT international application number PCT/US2018/046821 filed on Aug. 16, 2018, incorporated herein by reference in its entirety, which claims priority to, and the benefit of, U.S. provisional patent application Ser. No. 62/547,087 filed on Aug. 17, 2017, incorporated herein by reference in its entirety. Priority is claimed to each of the foregoing applications.

The above-referenced PCT international application was published as PCT International Publication No. WO 2019/036547 A1 on Feb. 21, 2019, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to vehicle hitch-mounted carrying systems, and more particularly to vehicle hitch-mounted carrying systems for wheeled scissor lift cargo carts and mounted payloads.

2. Background Discussion

Currently, standard vehicle hitch receivers or trailer hitches such as standard two-inch vehicle hitch receivers are underutilized. In general, the standard vehicle hitch receiver performs four applications: pulling a wheeled trailer, mounting a bicycle-carrying rack, carrying mobility devices such as powered wheel chairs, and carrying cargo platforms for coupling items thereon.

In one form, a cargo carrying platform utilizes a scissor lifted cart assembly with a load bearing mounting component comprised of a vertical male tube or pin and a vehicle hitch receiver mounted adapter with a female vertical pin receiver for the vertical male tube or pin to enable coupling and mounting of the cargo carrying platform to a vehicle hitch receiver for transportation.

A problem with the above described hitch assembly is that vehicles such as SUV's or pick-up trucks comprise an unloaded suspension that assumes a particular angle compared to the road or ground. With a substantial load on the vehicle hitch receiver or trailer hitch located at the distal rear of the vehicle, the vehicle's rear suspension will compress under the load while causing the front vehicle suspension to unload due to the cantilever effect of the load being located behind the rear wheels. This combination of rear suspension compression and front suspension unloading causes the pitch angle of the vehicle to rotate rearward, thereby lowering the rear of the newly hitch mounted load dangerously close to the ground. This situation also produces an unlevel cart and associated payload which may have a detrimental effect on the operation of various cart mounted payloads.

In another form, a hitch adapter device compensates for this unwanted rearward pitch by utilizing a pitch variance system to adjust the carried pitch of the cart, implementing a forward pitch onto the cart and associated hitch adapter by requiring a strong physical push by an operator to induce the forward pitch. However, some operators do not have the physical strength to accomplish this maneuver, may forget to perform this step in a procedure, or the push could induce injury.

In all the above-mentioned forms, there is an unfortunate translation of sharp acceleration forces and vibration to the cart and associated load from potholes, bumps and other road imperfections. These forces are magnified by the positioning of the load at the distal rear of the vehicle outside of the vehicle's designed suspension dampened zone, which is naturally focused on the vehicle interior. These forces are potentially damaging to sensitive cart loads such as communication systems.

Another disadvantage of prior approaches is the inability of the system to dynamically vary the required pitch angle of the cart as the payload weight changes or equal weight loads induce different pitches on different vehicles due to variables in suspensions. Prior approaches are also unable to dynamically vary the pitch of the mounted payload to provide a level payload surface for a mounted cart and associated payload when the carrying vehicle is parked on an incline. This ability is necessary for applications such as parcel delivery to prevent inadvertent parcel ejection, satellite communication systems to provide a level surface to assist automated satellite acquisition, radio, cellular or microwave communications systems to enable vertical alignment of antennas and masts, the use of field desks and workstations, etc.

BRIEF SUMMARY

An aspect of the present disclosure is a motor vehicle receiver hitch adapter with associated wheeled scissor lift cargo cart and mounted payloads. In one embodiment, the hitch adapter comprises a variable pitch control system for mounting a cargo cart and attached payload in which the scissor lift mechanism within the cart is also capable of compressive force to power a dynamic pitch control system. In one embodiment, the cart also incorporates a restraint system to prevent carrying vehicle damage, and a vibration dampening system to protect carried payloads.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 16:
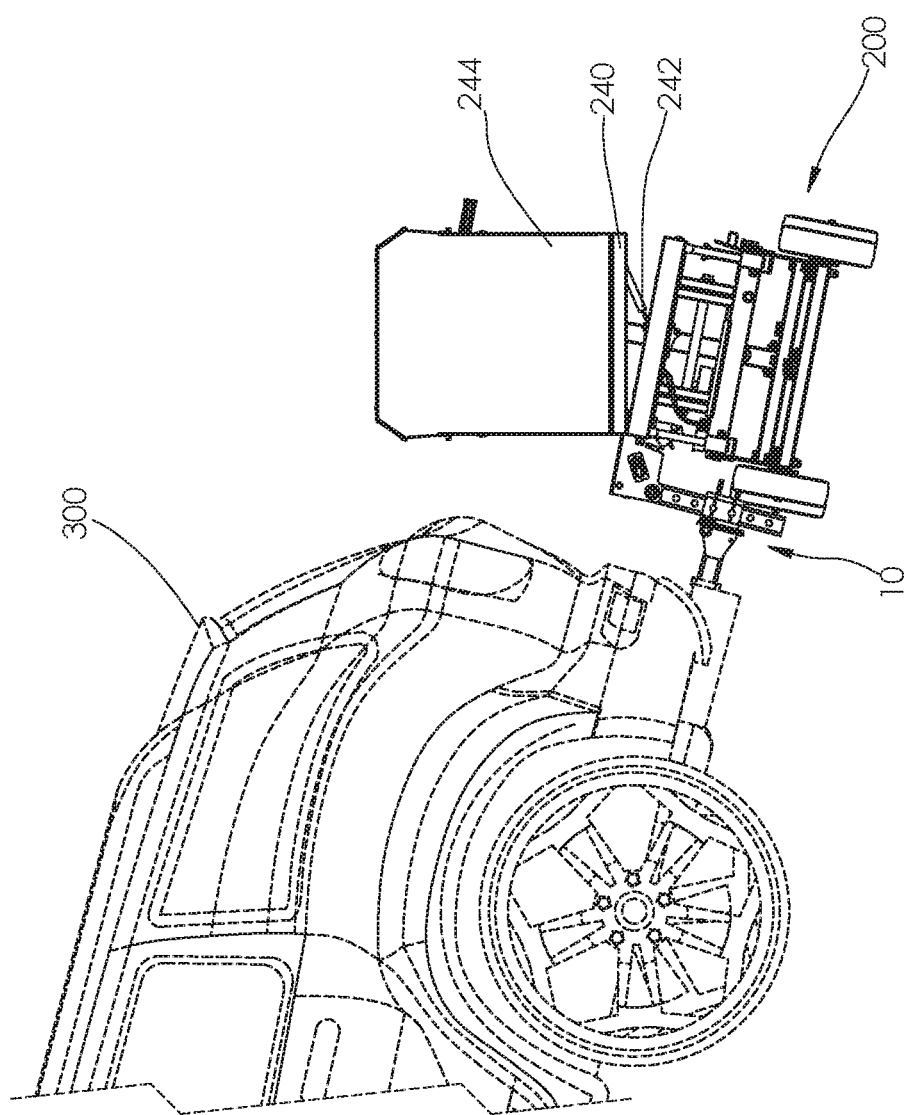

FIG. 16: shows a side view of the mounted scissor lift cart to illustrate the automatic payload leveling system in accordance with the present description.

Figure 17:
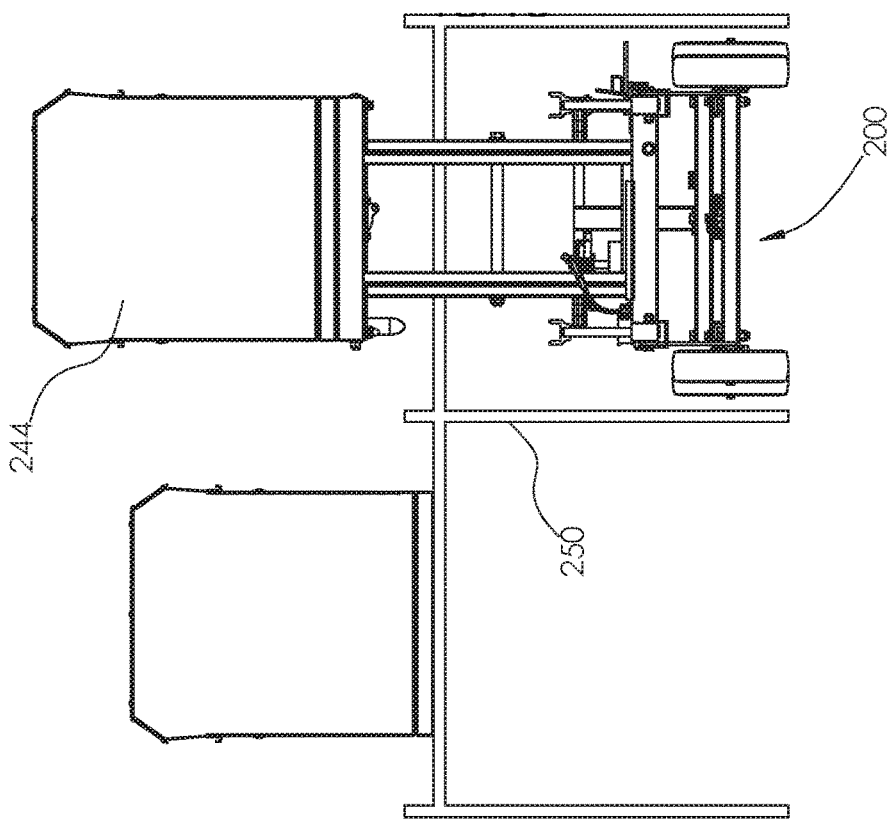

FIG. 17 shows a front view of the scissor lift cart of FIG. 3 with the cart positioned below a racked payload.

Figure 3:
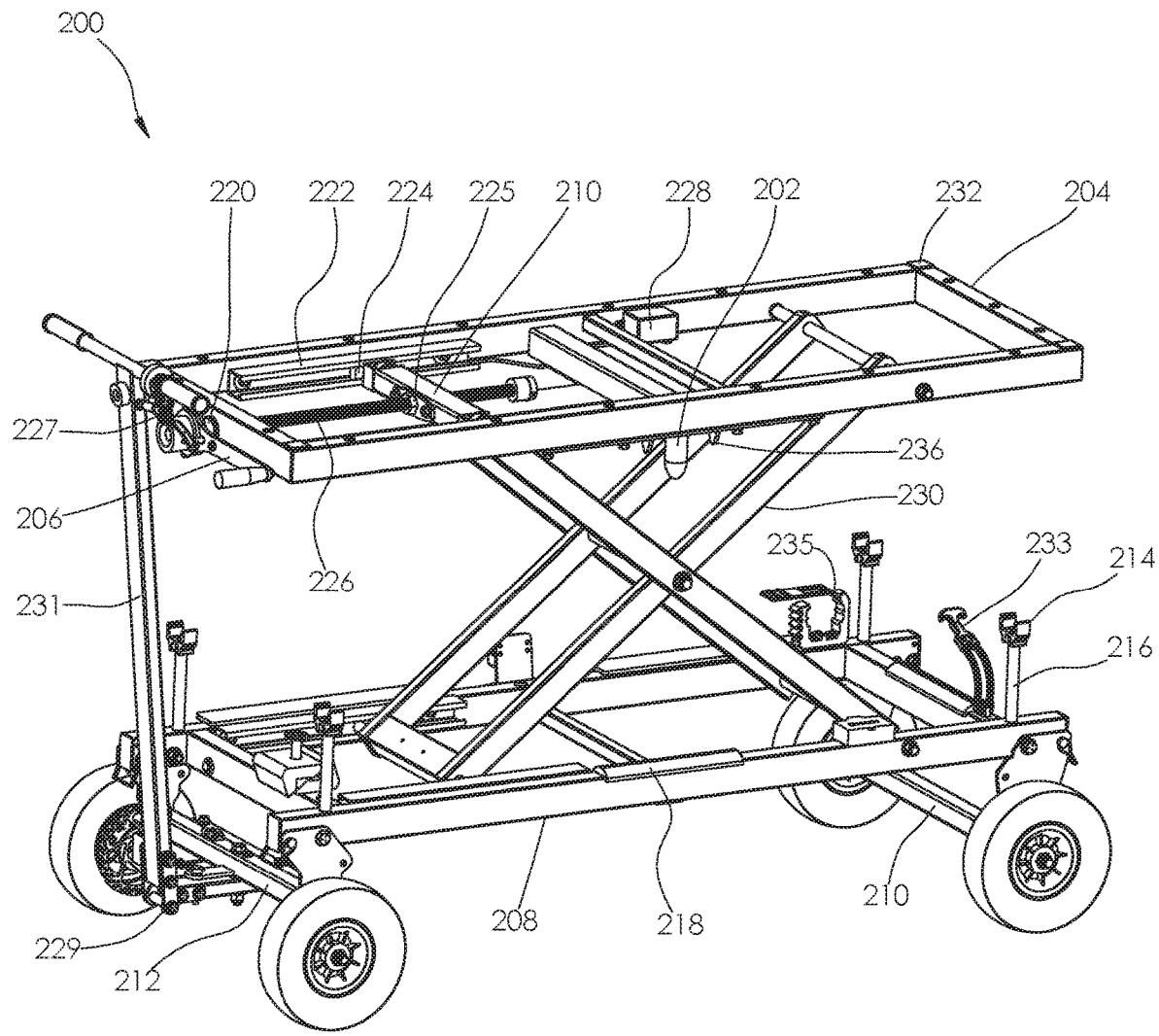
FIG. 3 shows an assembled perspective view of a scissor lift cart assembly compatible with the hitch adapter assembly of FIG. 1.
Figure 18:
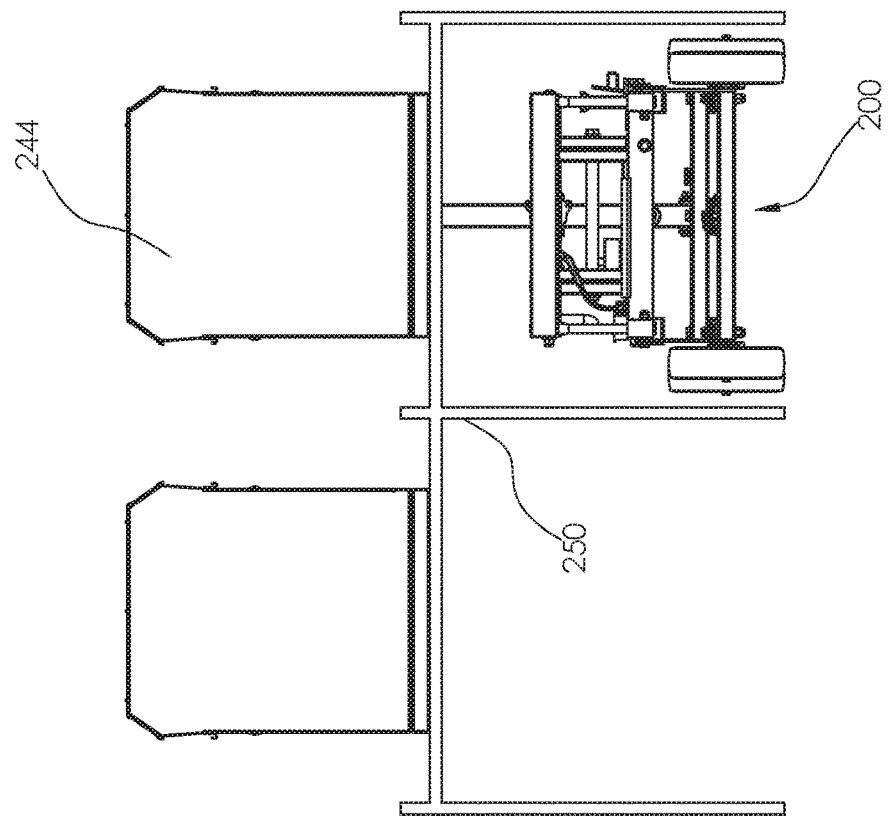

FIG. 18 shows a front view of the scissor lift cart of FIG. 3 with the cart lifting the payload off the rack.

Figure 19:
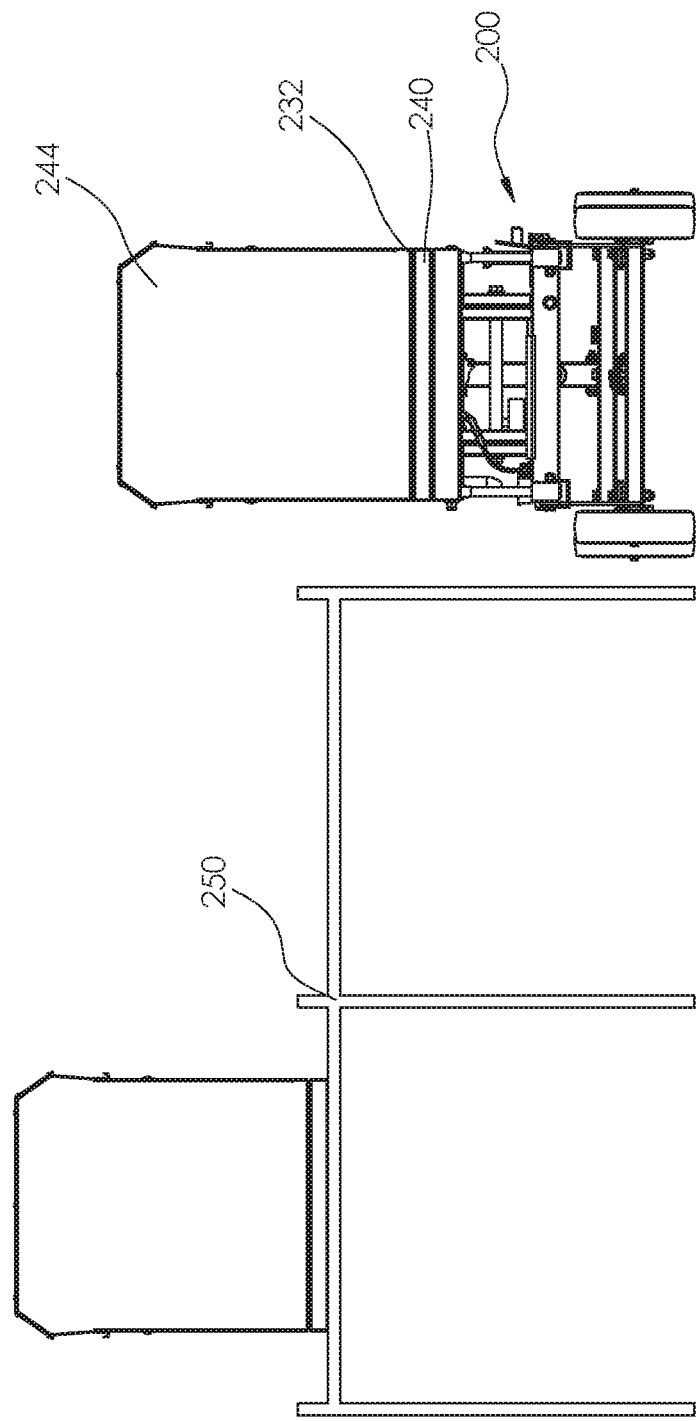

FIG. 19 shows a front view of the rack, scissor lift cart of FIG. 3 and loaded payload.

Figure 20:
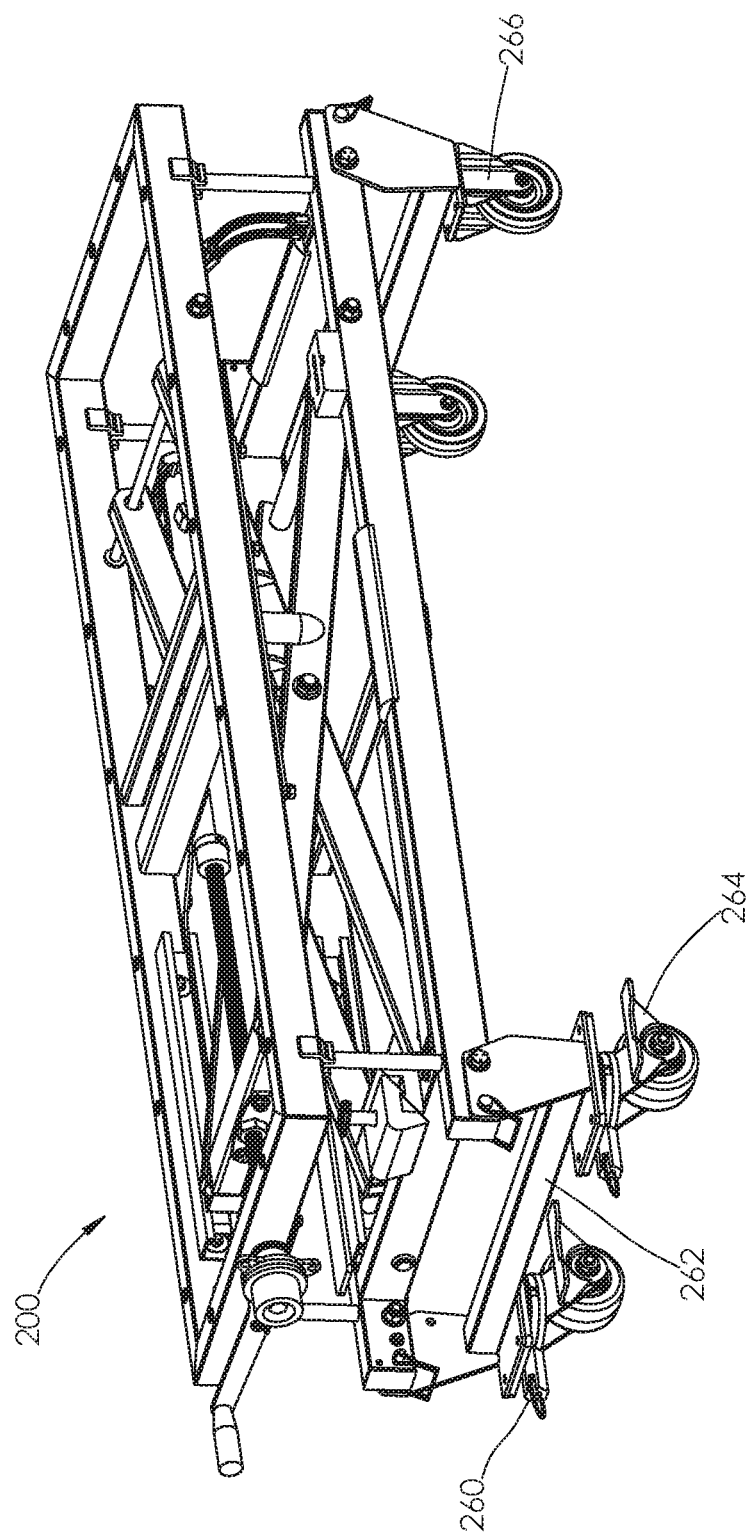

FIG. 20 shows a perspective view of the scissor lift cart of FIG. 3 with caster wheels.

Figure 21:
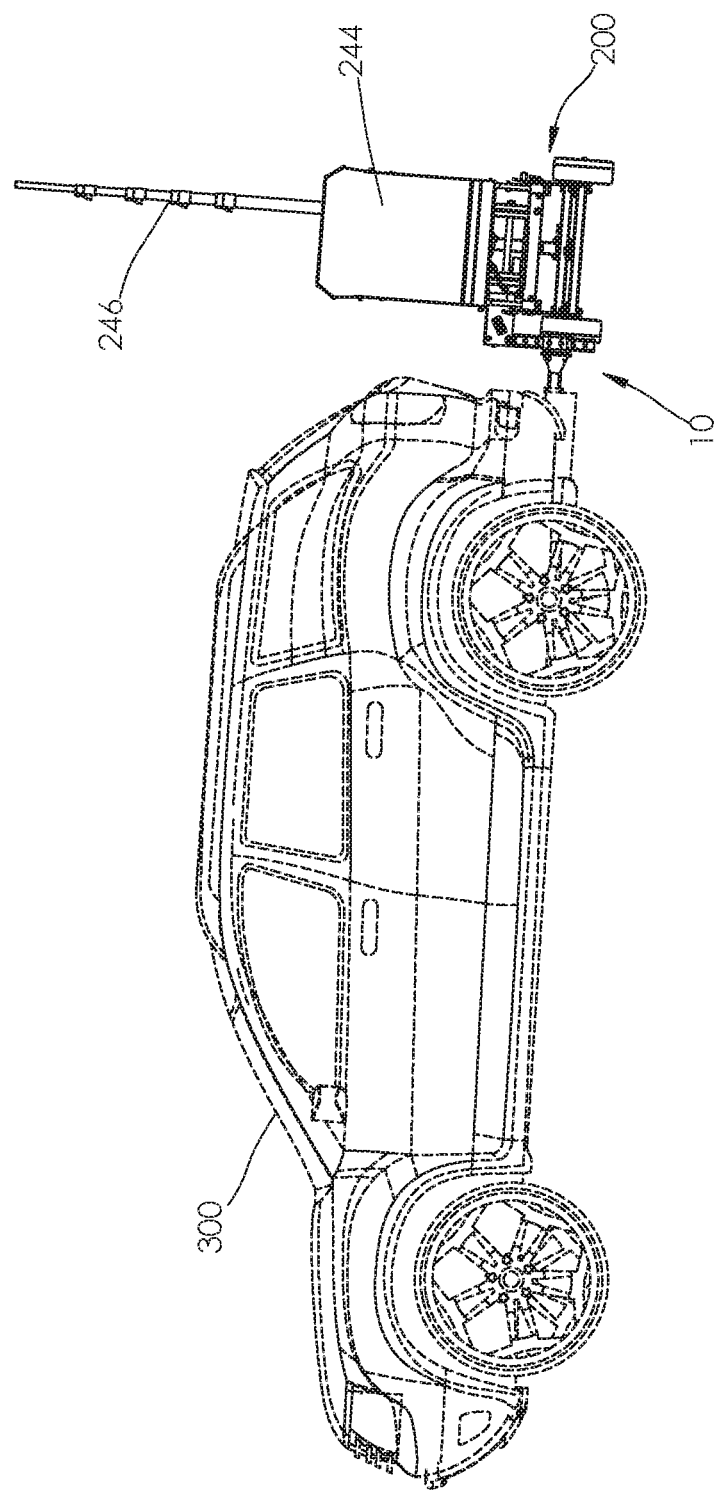

FIG. 21 shows a side view of the mounted scissor lift cart to illustrate the uneven terrain causing tilt of cellular or radio mast.

Figure 22:
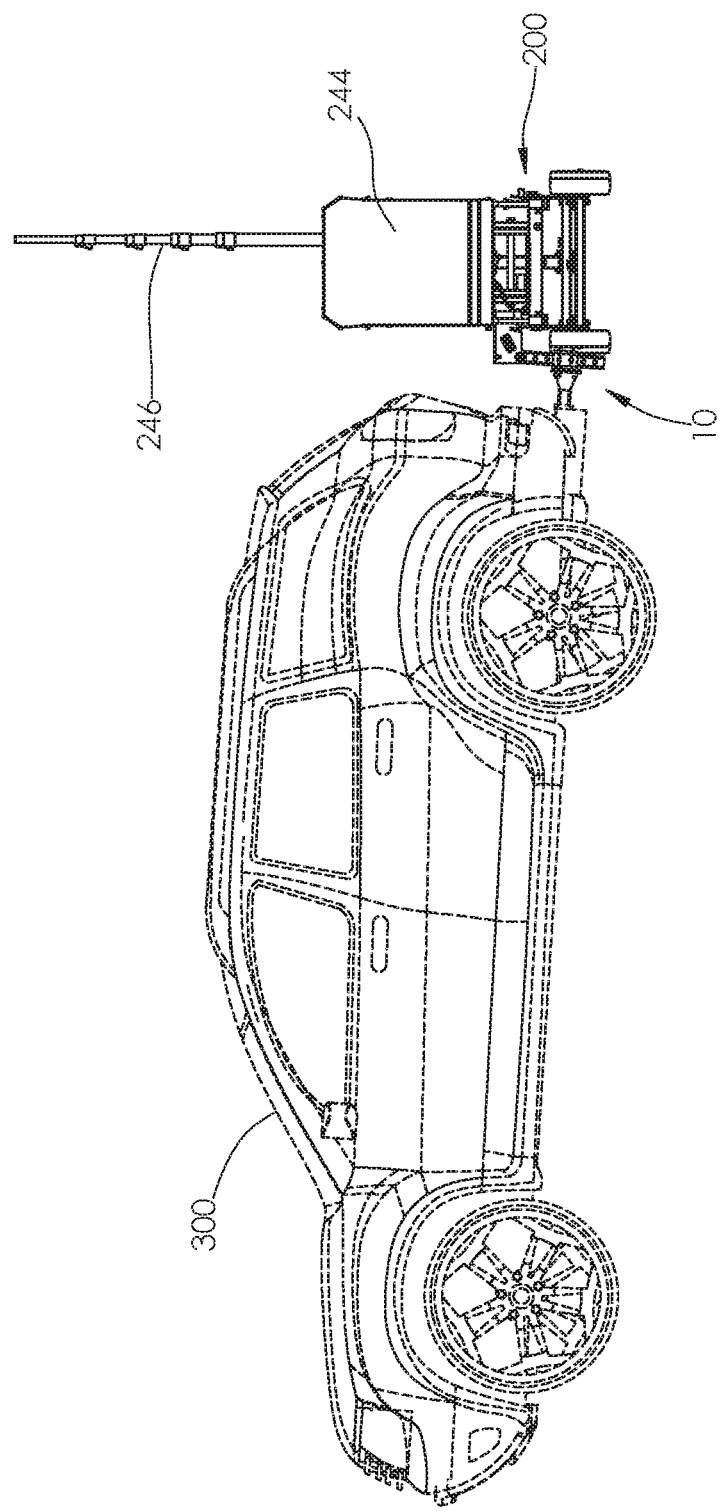

FIG. 22 shows a side view of the mounted scissor lift cart to illustrate the hitch adapter adjusting the cart pitch to straighten cellular mast.

DETAILED DESCRIPTION

1. Hitch Adapter

Figure 1:
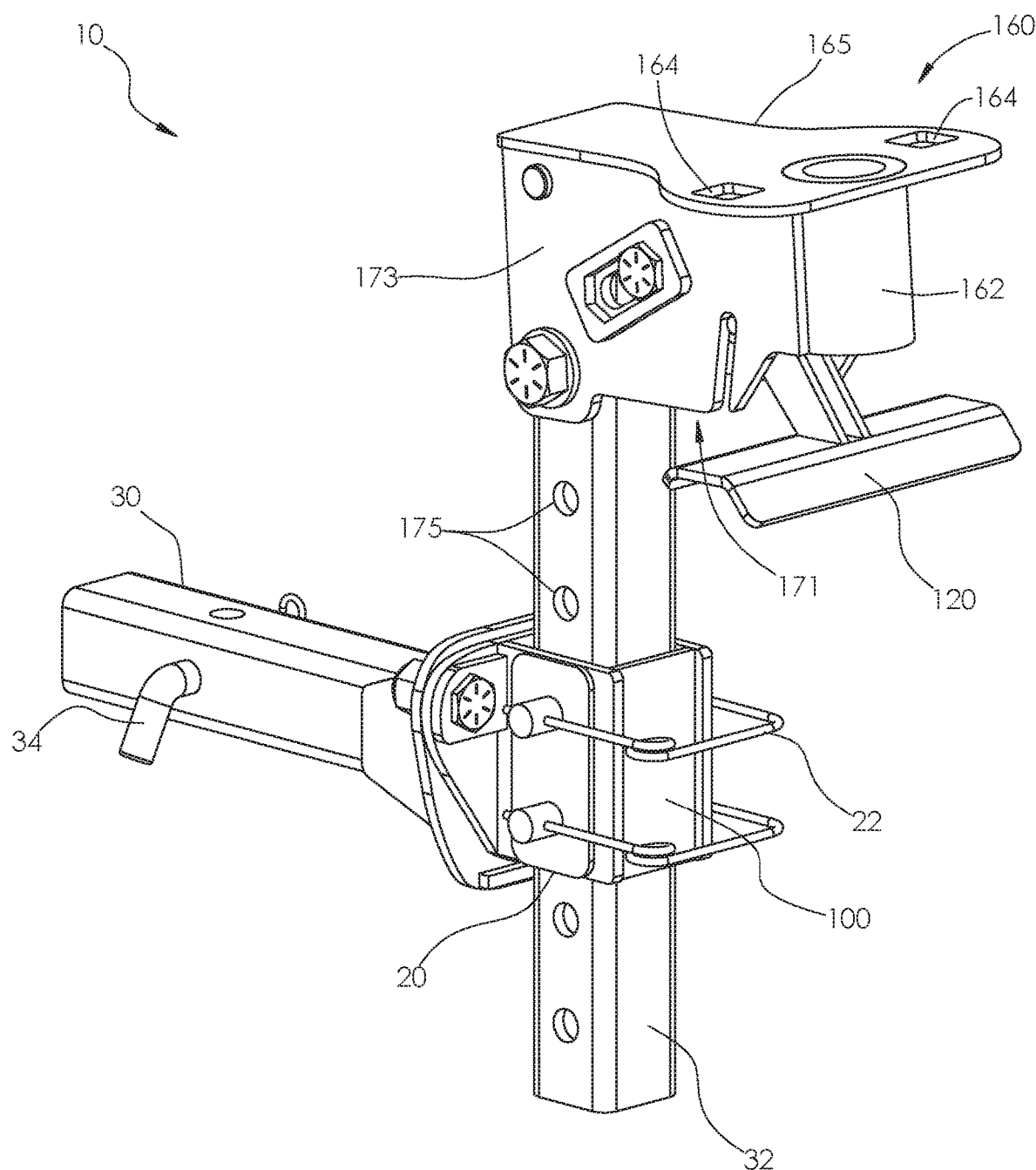
FIG. 1 shows an assembled perspective view of a hitch adapter assembly in accordance with the present description.
Figure 2:
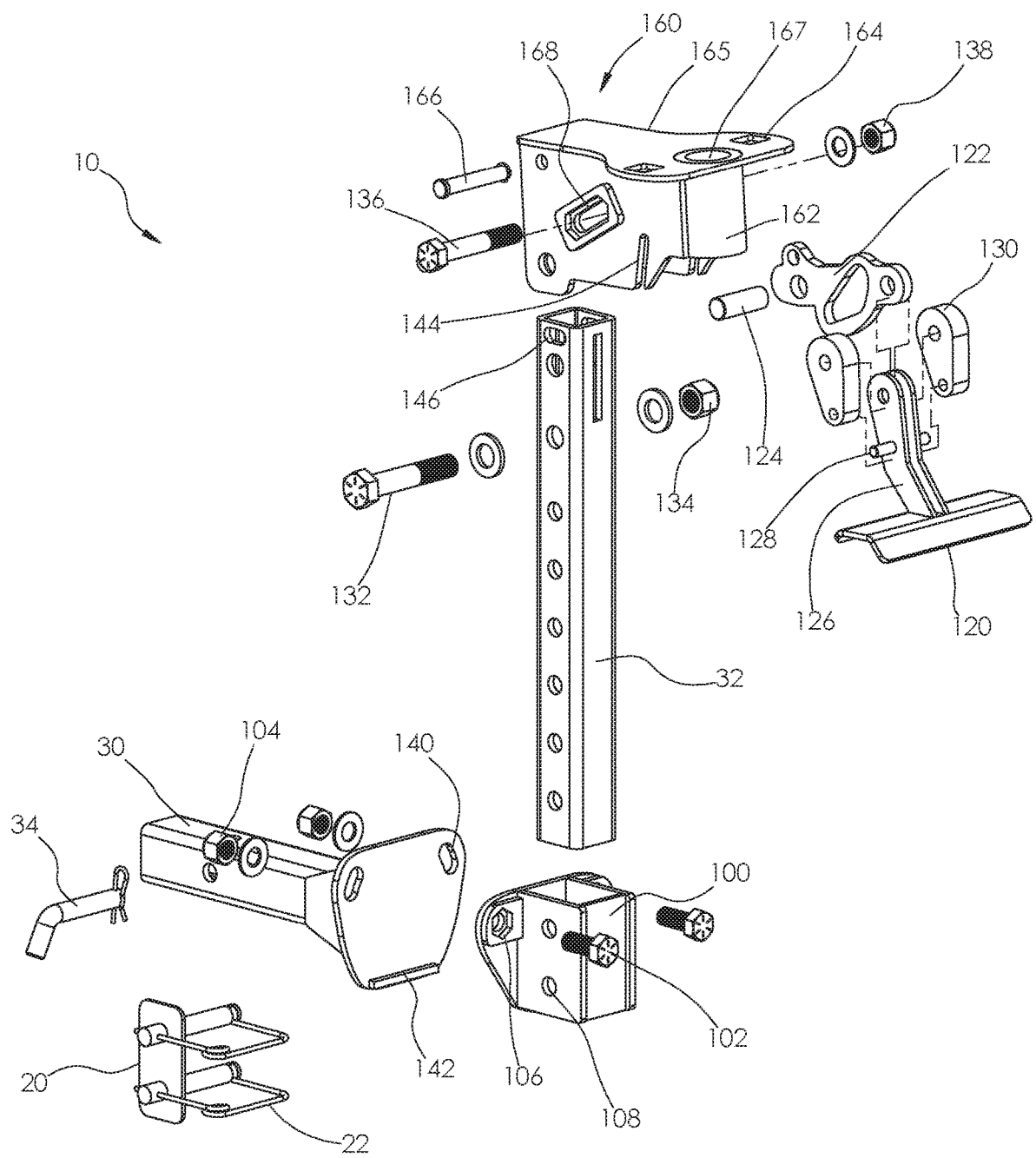
FIG. 2 shows an exploded perspective view of the hitch adapter assembly of FIG. 1.

FIG. 1 and FIG. 2 show assembled and exploded perspective views, respectively, of a hitch adapter assembly 10 in accordance with the present description. Hitch adapter assembly 10 comprises a receiver tongue 30 that is configured to be inserted into hitch receiver of a vehicle and secured using hitch pin 34. A height adjustment receiver 100 is coupled to one end of the receiver tongue 30 via fasteners. As shown in FIG. 2, the free end of receiver tongue 30 comprises a roll support plate 142, wherein the bolts 102 are secured through wrench plates 106 of height adjustment receiver 100 and bolt slots 140 of the roll support plate 142 via roll adjustment nuts 104 (FIG. 2) are loosened with a wrench (but not removed) on bolts 102.

Height adjustment receiver 100 is configured to receive height adjustment post 32 that is coupled at its upper end to a mounting box assembly 160. A pair of pins 20 lock vertical orientation of the height adjustment post 32 via insertion through height adjustment holes 108 of the height adjustment receiver 100 and a pair of holes 175 in height adjustment post 32. Pins 20 are secured with the wrap-around spring pins 22.

Mounting box assembly 160 comprises an upper plate 165 that provides a generally planar upper mounting surface that opens to a vertical receiver tube 162 disposed between a pair of tab slots 164. The receiving tube 162 is flush with the upper mounting surface of upper plate 165 such that a circular aperture 167 opens to a pin receiving passageway. Mounting box 160 comprises a cavity 171 defined by the upper plate 165, side plates or walls 173, and receiver tube 162 toward the front of the mounting box, the bottom and rear extents of the mounting box 160 are open to the cavity 171. Mounting box 160 is fastened to upper end of the height adjustment post 32 via pitch bolt 132 and corresponding nut 138. A push arm endplate 120 is fastened to the mounting box 160 via push arm 126, pitch lever 122, pivot pin 124, link pin 166, push arm spacers 130, and pitch stop bolt 136 which is secured through slots 168 via corresponding nut 138.

In one embodiment, the receiver tongue 30 and height adjustment post 32 are laser cut from heavy walled steel tubing. The vertical receiver tube 162 is cut from heavy walled seamless steel round tubing drawn over mandrel (DOM). The double pins 20 are machined 1144 steel, heat treated and welded to a fixture plate. The push arm spacers 130 are milled from sheets of a polymer such as polypropylene, polyethylene or polyoxymethylene. The push arm endplate 120 is laser cut from alloy steel and formed with a hydraulic press brake. Pins 124 and 166 are cut from heat treated 1144 steel. All other components are laser cut from flat alloy steel plates, welded and bolted with grade 8 bolts, washers and nylock nuts.

Figure 9:
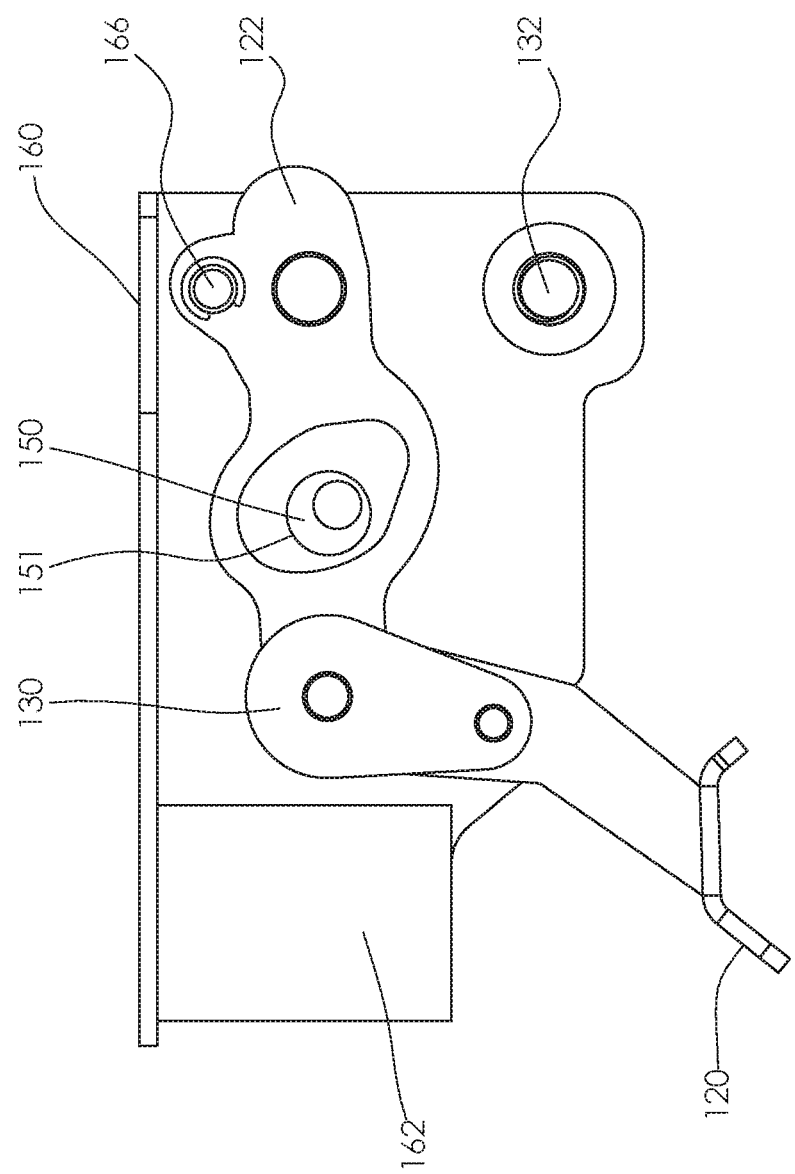
FIG. 9 is a side view of the pitch box and manually or electronically adjusted eccentric pitch stop bolt variation of the hitch adapter assembly of FIG. 1.

In one embodiment, the push arm endplate 120 may also incorporate an embedded inductive power transmission coil (not shown) to inductively transmit power to the carried scissor lift cart 200, an exemplary configuration of which is shown in FIG. 3. The hitch adapter 10 may also contain an electronic pitch control module 180 (see the mounting box assembly 160a of FIG. 11) or manual pitch adjustment knobs 182 (see the mounting box assembly 160b FIG. 12) for adjusting the pitch stop components 136,150 (FIG. 9). Other included components may comprise a static inverter (not shown) to convert vehicle supplied direct current (DC) to alternating current (AC) in order to enable inductive transmission of electrical current through the push arm endplate 120 to the cart 200 (FIG. 3).

In some configurations, a GPS system (not shown) may be included for accurate vehicle location. In further configurations, one or more of a satellite communication antenna (not shown) such as a BGAN or flat panel terminal, a communications module to communicate via radio signal with a logic module 228 within the cart 300 (FIG. 3) or carried payload 244 (FIG. 15 through FIG. 19), and a radio communications system (not shown) to connect the hitch adapter to a cell phone or the cellular network and Internet for Internet of Things (IoT) or other data communications purposes. A wiring harness (not shown) may also connect the hitch adapter 10 to the carrying vehicle 300 electrical system to receive electrical power as well as stop, turn and other signal light inputs.

All electrical/electronic components are preferably sealed, and polymer potted for weatherproofing. Any steel components are preferably galvanized, zinc chromate plated, painted or powder coated for corrosion resistance.

2. Scissor Lift Cart

FIG. 3 shows an assembled perspective view of a scissor lift cart assembly 200 having a mounting configuration compatible with the hitch adapter assembly 10 of FIG. 1. In a preferred embodiment, the scissor lift cart 200 is primarily comprises rectangular tubing (e.g. extruded 6061-T6), which is laser cut, routed or milled and then bolted or welded. The primary frame components are the upper frame 204, lower frame 208 and the scissor leg assembly 230. A push arm contact plate 218 provides protection and an anchor point for contacting and forcing the push arm endplate 120 (FIG. 2) upwards when the upper and lower frames 204,208 are compressed toward each other by the scissor assembly 230 (see FIG. 4 and FIG. 5, which respectively show the scissor lift cart in an elevated configuration prior to engagement with the hitch adapter assembly, and the scissor lift cart in a partially compressed configuration prior to compression of the pitch control mechanisms). The contact plate 218 seated on the push arm endplate 120 allows for to operation of the pitch control system, which is described in further detail below.

In one embodiment, the push arm contact plate 218 may also contain an inductive current receiving coil (not shown) to facilitate the transfer of electrical power from the carrying vehicle 300 through the hitch adapter 10 inverter to charge batteries and power scissor lift 300 or payload mounted lighting, communications, electrical or logic devices.

The underside of the upper frame 204 comprises a mounting or load pin 202 disposed between a pair of tabs 236, all disposed so as to point in a downward vertical orientation to interface with corresponding aperture 167 and tab slots 164, respectively of the mounting box assembly 160 of hitch adaptor 10. The load pin 202 and tabs 236, as well as mating features (e.g. upper plate 165, receiver tube 162, etc.) are preferably machined, laser cut and welded from one or more of 1144 steel, alloy steel plate and thick walled square steel tube.

Reciprocation of the scissor leg assembly 230 to affect translation of the upper frame 204 with respect to the lower frame 208 is achieved via an acme screw 226 (preferably steel or stainless steel) that is coupled to the upper frame 204 and scissor leg assembly 230 via a thrust bar 210 containing a mating acme nut 225 contained in the thrust bar 210. Upon rotation of lift handle 206, four sliders 224 (e.g. low-friction polymer such as polypropylene, polyethylene or polyoxymethylene, or the like material) disposed on opposite ends of thrust bar 210 and free legs of scissor leg assembly slide within four bidirectional load bearing aluminum slide channels 222 that are disposed on inner opposing surfaces of the upper frame 204 and lower frame allow translation of thrust bar 210 and corresponding contraction and extension of the scissor leg assembly 230.

In a preferred embodiment, a vibration dampening spring 220 is disposed between lift handle 206 and upper frame 204, and may be made from spring steel or an advanced polymer such as urethane.

Cart 200 is configured to roll freely via a fixed wheel assembly 210 and steerable wheel assembly 212 that is coupled to T-bar steerer 231. In one embodiment, the fixed wheel assembly 210 is manufactured from 6061-T6 aluminum tubing and laser cut or milled plates which are welded to each other and lower frame 208. A steel axle supports rubber or similar polymer wheels. Steerable wheel assembly 212 is built in similar fashion to fixed wheel assembly 210 with the addition of a dual rotor, mirrored hydraulic brake system 227 with a parking brake.

The support posts 216 and frame saddles 214 extending from bottom frame 208 are configured to couple the upper frame 204 to the lower frame 204 when the cart 200 is in a compressed configuration. In one embodiment, the support posts are cut from solid 6061-T6 aluminum and welded to frame 208, and the frame saddles 214 are machined from aluminum or a strong polymer such as glass filled nylon.

The cart 200 may also include fastening means 233/235 for releasably securing the hitch adapter 10 when not used for mounting. In one embodiment, fastening means 233/235 comprise rubber straps that securely hold the entire hitch adapter 10 in a "nest" within the lower frame 208 of the cart 200 when the hitch adapter is not attached to the carrying receiver.

In one embodiment, payload monitoring load cells 232 are coupled to the upper surface of frame 204 and are connected to a logic module 228. Logic module 228 may comprise a wide array of components (not shown), such as, but not limited to: level sensors, GPS, Wi-Fi, satellite or Bluetooth communications circuitry, a rectifier for converting inductively transferred AC current to DC, lighting controls, payload 244 (see FIG. 115-FIG. 19) handshake inputs, a microprocessor, battery, and other components to support a wide array of applications.

A further embodiment of the cart 200 would include the addition of a rear-view camera and/or proximity sensors (not shown) to assist the operator in safe operations when the carrying vehicle doesn't have a camera and proximity sensors, or where the cart 200 blocks the existing carrying vehicle camera and proximity sensors.

In an alternative embodiment shown in FIG. 20, the wheel assemblies 262 are constructed of both fixed direction casters 266 and swiveling casters 264. In one embodiment, the swiveling casters 264 may be locked in place by a spring pin 260. Further modifications to the wheel assemblies 210, 212 of FIG. 2 may provide for the use of a pneumatically or electrically powered system for automatically raising the wheel assemblies 210, 212.

3. Use and Operation

In use and operation, and referring to the drawings, an almost unlimited number of devices or payloads 244 (FIG. 15 through FIG. 19, FIG. 21, and FIG. 22) may be attached to the upper frame 204 of the cart using bolts or other attachment means. Examples are inclusive of but not limited to desks, cargo boxes, heated or chilled food delivery enclosures, rack mount enclosures, communications systems, satellite systems, medical treatment stations, instrumentation and control systems, pumping systems, barbeques, street kiosks, liquid dispensing systems, and parcel delivery systems. The payload 244 may be limited to a simple mechanical connection to the cart 200, or connected with automatic engagement means which enable rapid interchange of payloads as will be discussed below.

Other embodiments include load cells 232 (FIG. 3) either attached to the upper frame 204 of the cart 200 or the payload 244 which measure the total weight and weight distribution of the payload 244 and transmit signals to the cart logic unit 228 or other device such as a cell phone, inductive coil pads which receive induced current generated from the carrying vehicle 300 and passed through the hitch adapter 10 and cart 200, and load leveling mechanisms 242 (e.g. powered struts 242 of FIG. 16, detailed further below) which sense when the payload 244 is not level and extend automatically to level the payload 244 and prevent payload contents from falling out when the access door is opened.

The cart 200 may be pushed or pulled to wherever it is needed, including through doorways and on elevators and escalators. When at the point of use, the scissor lift assembly 230 may be used to position the payload to the correct height for use.

Figure 4:
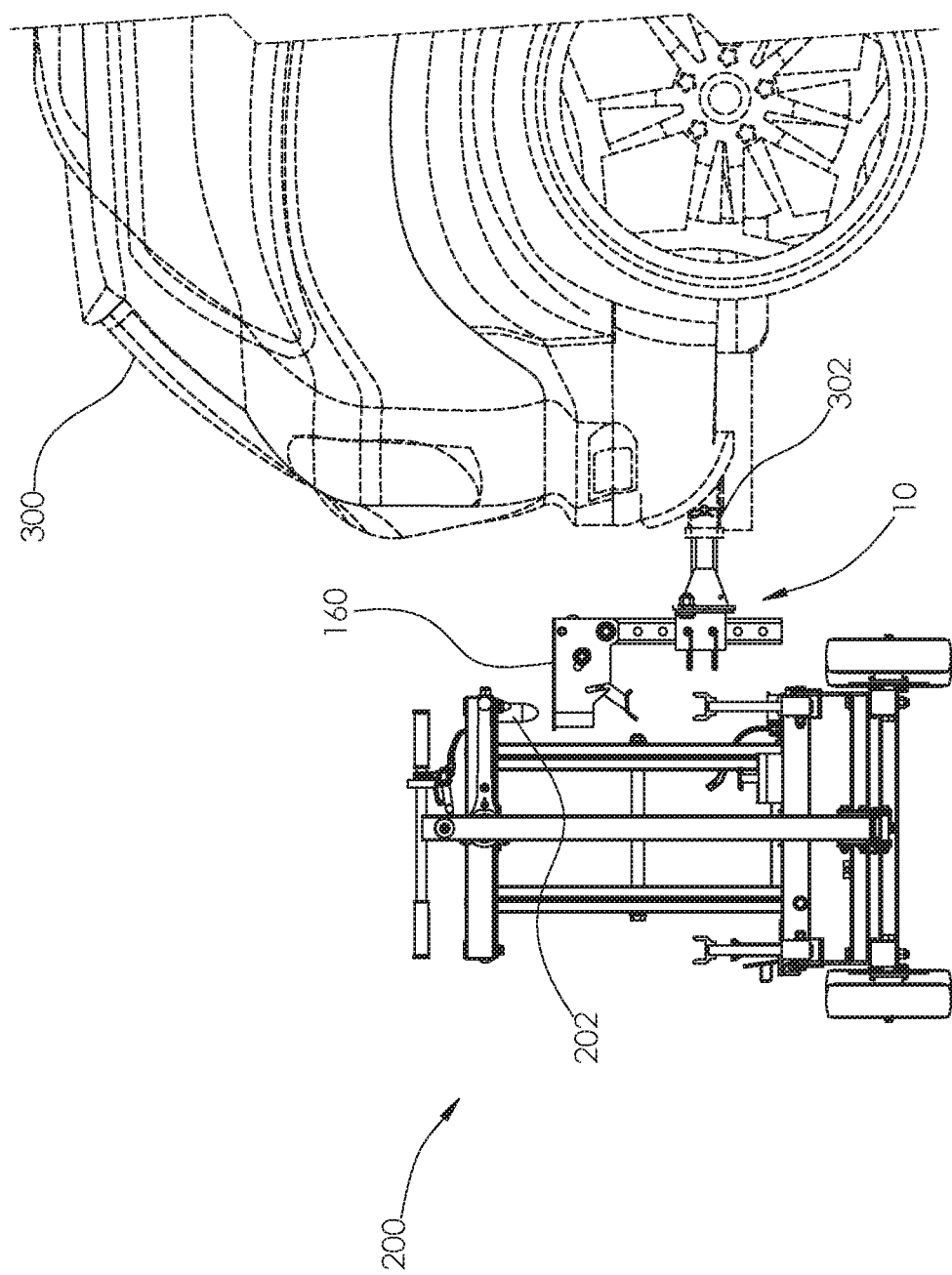
FIG. 4 illustrates an assembled side view of the scissor lift cart of FIG. 3 in an elevated configuration prior to engagement with the hitch adapter assembly of FIG. 1, which is shown installed in the hitch receiver of a vehicle.

Referring now to FIG. 4, when ready for vehicular transport, the cart 200 is rolled to the rear of any vehicle 300 with a load bearing connection 302 such as a receiver hitch (trailer hitch), tow bar hitch, swan neck hitch or other type of connection. If no load bearing connection is included with the carrying vehicle 300, any number of after-market devices may be attached to the carrying vehicle 300 to enable hitch adapter 10 mounting. When in place, the cart scissor lift 230 is elevated slightly in order to remove the carried hitch adapter 10 coupled to the cart 200 via fastening means 233/235, and the hitch adapter 10 is then installed (attached) to the carrying vehicle 300.

To install the vehicle hitch adapter 10 in a preferred embodiment, the receiver tongue 30 is inserted into vehicle 300 hitch receiver tube 302 and secured using hitch pin 34. In one embodiment, the hitch receiver 302 is any two-inch Class III or greater hitch receiver (trailer hitch). Next, the double pins 20 are removed from the height adjustment holes 108 (FIG. 2), and the height adjustment post 32 is slid to the correct height for safely carrying the cart 200 above the ground. The height adjustment post 32 is fixed within the height adjustment receiver 100 according to the height of the particular carrying vehicle 300 by placement of the pins 20 in corresponding apertures as illustrated in FIGS. 1 and 2, and secured with the wrap-around spring pins 22 respectively.

4. Roll Adjustment

Because vehicle hitch receivers 302 (trailer hitches) can vary from model to model, it is often necessary to compensate for inherent rotational disparities between the vehicle mounted hitch receiver 302 and the vehicle 300 so that the carried cart 200 and attached payload 244 are in rotational alignment with the carrying vehicle 300. To adjust the roll, or the angle side to side, the vehicle hitch adapter 10 is initially mounted on the vehicle 300 as described above and the levelness is observed.

To adjust the roll left or right, both roll adjustment nuts 104 (FIG. 2) are loosened with a wrench (but not removed) on bolts 102, which are rotationally locked by wrench plates 106. The hitch adapter is pivotably supported by roll support plate 142 and rotated within the bolt slots 140 to a roll position matching the carrying vehicle. Once level is achieved, the horizontal roll adjustment nuts 104 are retightened.

5. Mounting Cart to Vehicle

To safely transport cart 200 with attached payload 244, it is preferable to both elevate the cart 200 above the ground to a safe carrying height and to compensate for the weight induced sag which will occur to the carrying vehicle 300. Failing to compensate for this sag may result in the rear of the carried cart 200 riding dangerously close to the ground and may result in the cart 200 scraping on the ground or catching on a ground protrusion and being torn from the carrying vehicle 300. By mechanically inducing a forward tilt to the cart 200, the system rotates the rear of the cart 200 higher above the ground and enables the cart 200 to be transported in a safe manner. The forward tilt may be controlled by manually setting the pitch stop point, or automatically controlled with sensors and electronically controlled pitch adjustments. These controls may also be used to position a payload to a desired position for operation such as leveling a payload to provide a level work surface for desks or workstations attached to the cart 200 as a payload, or to provide a level payload surface to enable true vertical extension of a mast, antenna or satellite antenna system mounted to the cart.

On level ground and referring to FIG. 4 through FIG. 7, cart 200 is rolled to the rear of the vehicle 300 and positioned approximately perpendicular to the vehicle hitch adapter 10 as illustrated in FIG. 4.

Next, the upper frame 204 of the cart 200 is elevated utilizing scissor lift handle 206 until the load pin 202 is higher than the mounting box assembly 160 as illustrated in FIG. 4. While a manual lift handle 206 is shown, it is appreciated that an electrical or hydraulic motor (e.g. servo motor, stepper motor, or like mechanism known in the art) could be used to provide the rotational torque in the place of the scissor lift handle 206.

The cart 200 is then maneuvered so the load pin 202 extending from the upper frame 204 is directly above the aperture 167 of the vertical receiver tube 162 in the mounting box assembly 160 as illustrated in FIGS. 4 and 2.

Figure 5:
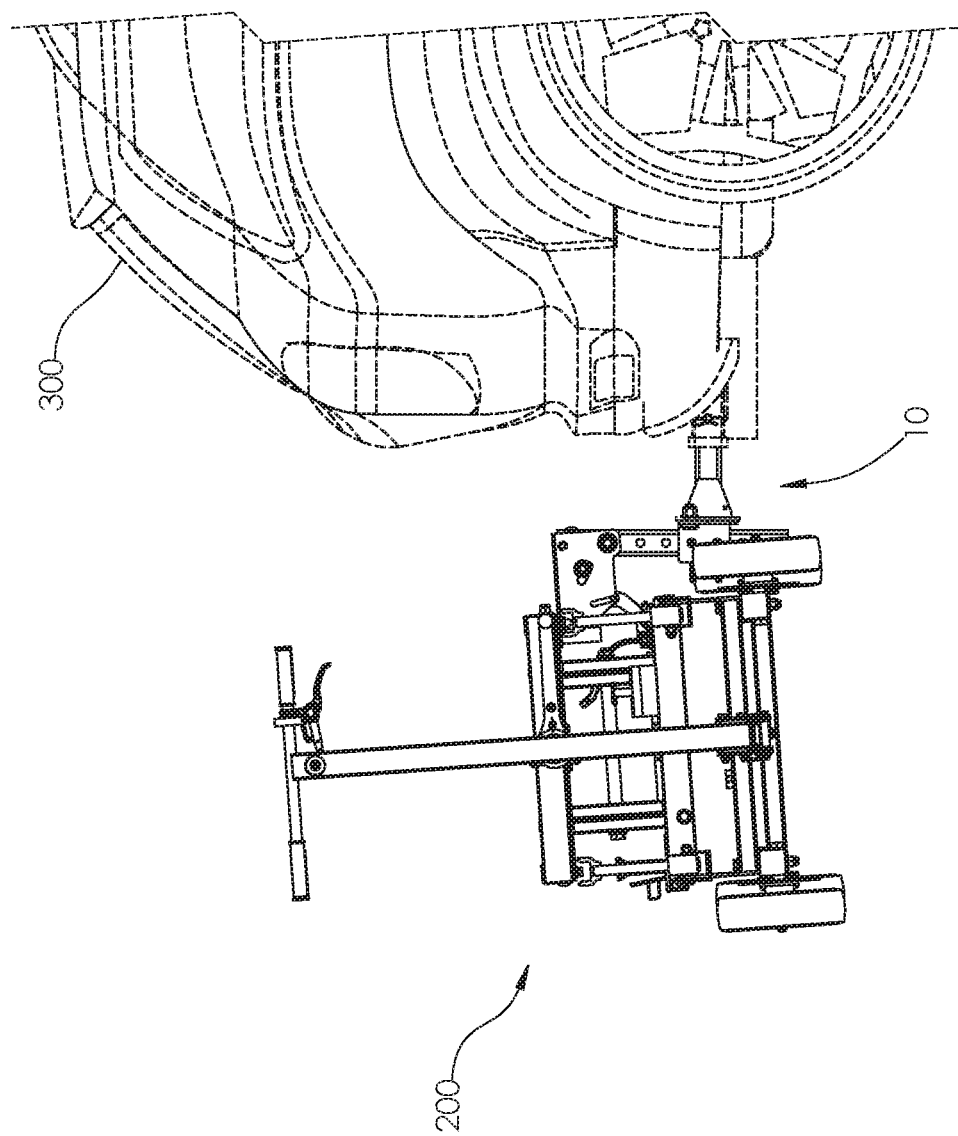
FIG. 5 illustrates a side view of the scissor lift cart in a partially compressed configuration mounted on the hitch adapter assembly of FIG. 1, prior to compression of the pitch control mechanisms.
Figure 10:
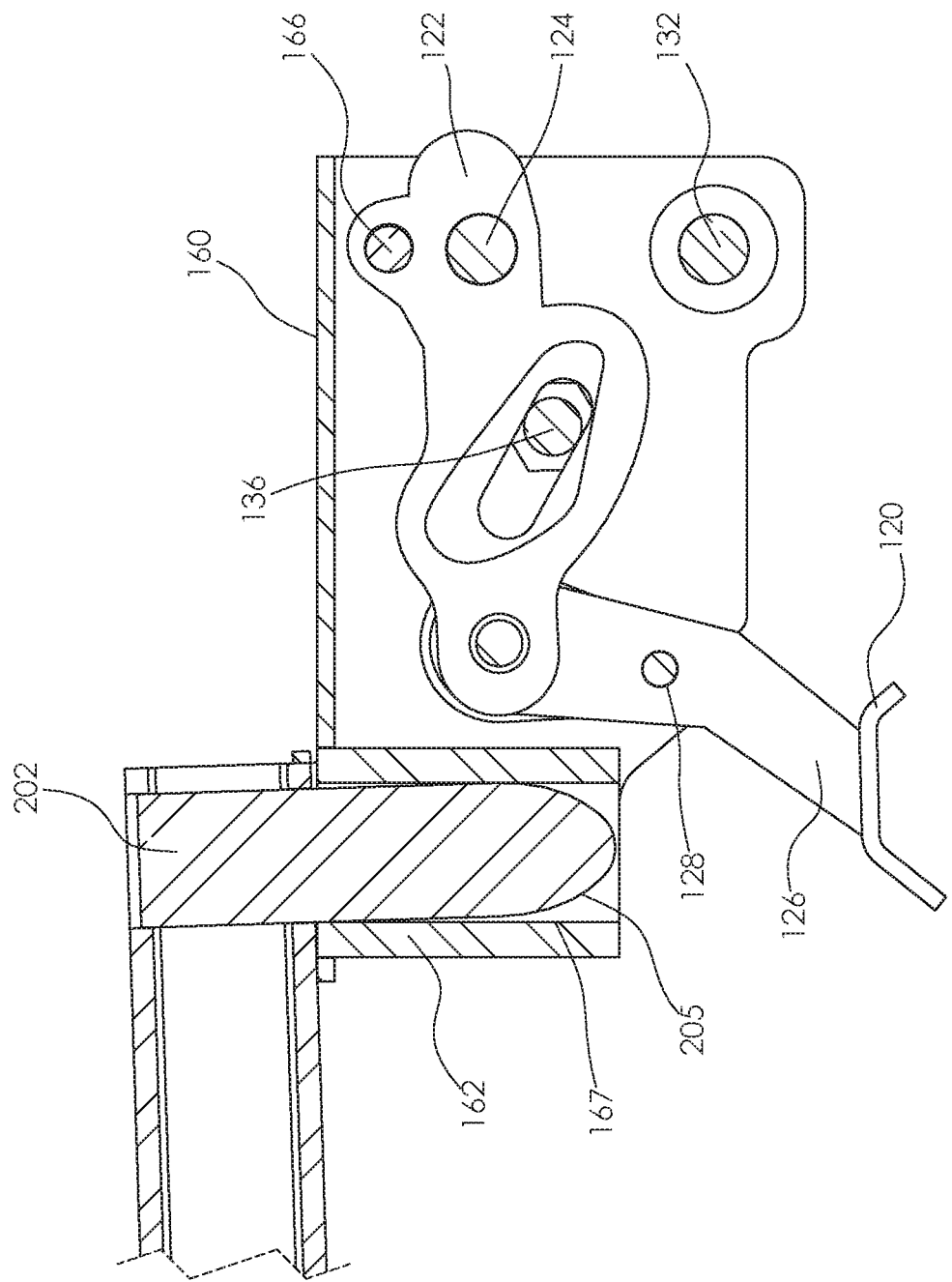
FIG. 10 is a side-section view of the pitch box and manually adjusted pitch stop bolt with cart load pin inserted.

Next, the lift handle 206 is rotated to lower the load pin 202 into the vertical receiver tube 162 until the load transfers from the ground onto the hitch adapter 10 (FIG. 4, FIG. 5 and FIG. 10).

If the cart 200 is not in the correct positional alignment with the hitch adaptor 10, the bullet-nose end 205 (see FIG. 10) of the load pin 202 is configured to guide the load pin 202 (and the cart 200) on upper plate 165 of mounting box 160 when off-center or mis-located from aperture 167. The hemi-spherical shape of end 205 and perimeter edges of aperture 167 serve to self-adjust the position of the cart 200 and pin 202 (the hitch adaptor 10 may also move) when the pin is off-center from the receiving tube 162.

If the cart 200 is not in the correct rotational alignment with the carrying vehicle 300, the load pin 202, being longer than the two alignment tabs 236 (FIG. 3), will be received partially in the aperture 167 of the receiving tube until the alignment tabs 236 contact the top plate 165 of the mounting box assembly 160. Upon further retraction of the scissor lift 230 and upper frame 204 of the cart 200, the alignment tabs 236 support the weight of the cart 200 until the wheels are off the ground. The cart 200 may then be rotated manually so that alignment tabs 236 rotationally align the cart 200 with the carrying vehicle 300 as they drop into the tab slots 164 (FIG. 2) until the load pin 202 is fully engaged with the vertical receiver tube 162. The alignment tabs 236 then assure that the cart 200 remains in the correct "yaw" relationship with the carrying vehicle 300.

It is appreciated that the positioning of the above mentioned components (e.g. load pin 202 and alignment tabs 236 vs. the receiving tube 162 and tab slots 164) may be switched (e.g. mounting the vertical receiver tube 162 and tab slots 164 on the cart 200 (either upper or lower frame 204, 208) and mounting the load pin 202 and tabs 236 to the hitch adapter 10 to retain the same function of self-aligning load-bearing elements.

After continued operation of the lift handle 206 until the push arm bracket 120 on push arm 126 (FIG. 2) engages the push arm contact plate 218 on the lower cart frame rail 208.

After further rotation of the lift handle 206 to cause the scissor mechanism 230 to apply compressive force to the push arm 126, a vertical force is applied to the pitch lever 122. Motion of the push arm 126 with respect to mounting box 160 is partially restrained via a pair of pins 128 in the push arm 126 that are guided by slots 144 in the mounting box 160 (see FIG. 2 and FIG. 8).

This novel ability of the cart 200 to apply both lift forces to the payload 244 in traditional scissor lift fashion and to apply a novel compressive force to operate the hitch adapter's 10 novel pitch controls is provided by the use of four novel polymer sliders 224, which are mechanically supported under both extending and compressing force of the scissor lift 230 by the four bidirectional force supporting slide channels 222. Thus, the system is capable of both great lifting (extending) force between the ground and a heavy payload 244, which may weigh 500 lbs. or more, and great compressive force (between the upper frame 204 and lower frame 208) to force the scissor lift 10 push arm 120,126 upwards, and thereby forcing the cart 200 and payload 244 into the correct forward pitched carrying position.

FIG. 5 illustrates a side view of the scissor lift cart in a partially compressed configuration mounted on the hitch adapter assembly of FIG. 1, prior to compression of the pitch control mechanisms. As seen in FIG. 5, the pitch of the cart 200 and hitch adaptor 10 is downward with respect to the ground, and not in an optimal orientation for towing.

Figure 11:
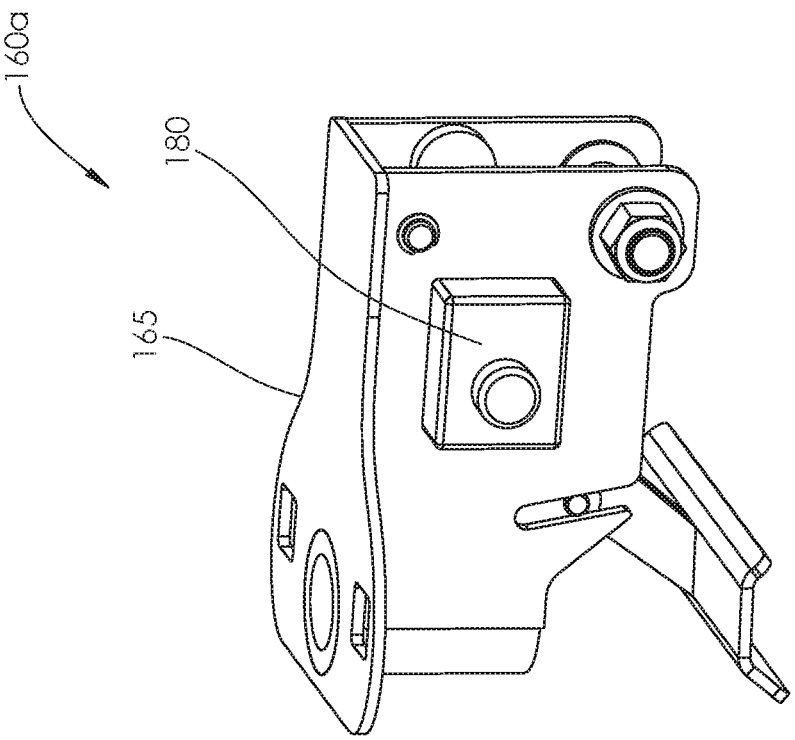
FIG. 11 shows a perspective view of a pitch box assembly with electronic pitch control module in accordance with the present description.

Referring to FIG. 2 and FIG. 8 through FIG. 10, as the pitch lever 122 is forced upwards from the force applied on the push arm bracket or endplate 120, it pivots around pivot pin 124 and forces link pin 166 to move with amplified mechanical force increased by the moment arm of the pitch lever 122. The link pin 166, which links the pitch lever 122 to the mounting box 160, applies force to the mounting box 160, forcing it and the attached cart 200 to rotate or tilt forwards around pitch bolt 132 toward the carrying vehicle until it is stopped by the manually adjusted pitch stop bolt 136, manually adjusted pitch stop eccentric bolt 150 (FIG. 9), or the cart/hitch adapter angle sensor system and motor positioned pitch stop eccentric shaft 180 (FIG. 11). Because the push arm endplate 120 provides a second contact location (e.g. at contact pad 218 of lower frame 208) that is spaced apart from a first location of the primary mounting interface (e.g. the load pin 202 and upper frame 204 with respect to the vertical receiver tube 162 and upper plate 165), the contraction of the scissor lift assembly to its fully retracted position acts to align the cart 200 to the hitch adapter in pitch angle. Further pitch adjustment may be applied to adjust for vehicle sag to align the cart with the ground, as described in further detail with below.

Figure 6:
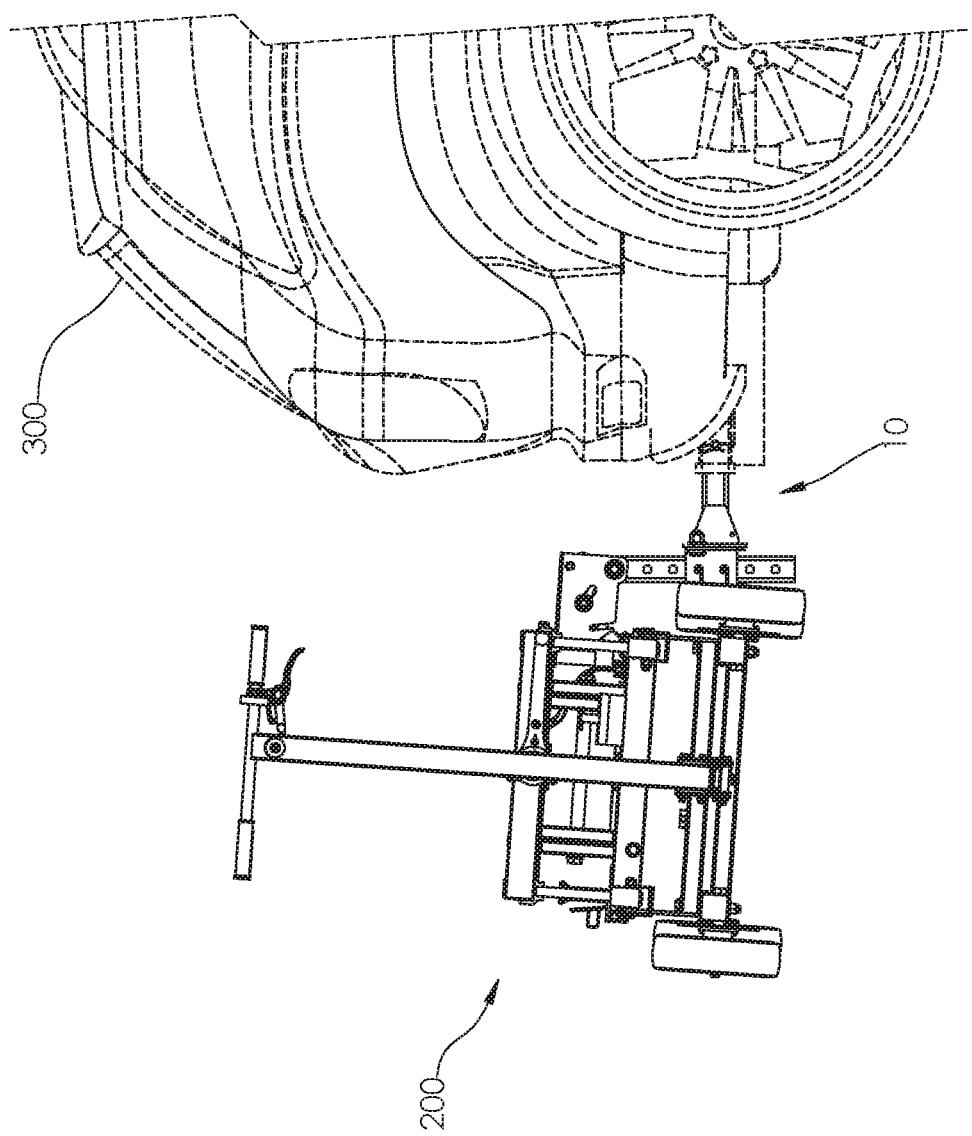
FIG. 6 illustrates a side view of the scissor lift cart mounted on the hitch adapter assembly of FIG. 1 after compression of the pitch control mechanisms.
Figure 7:
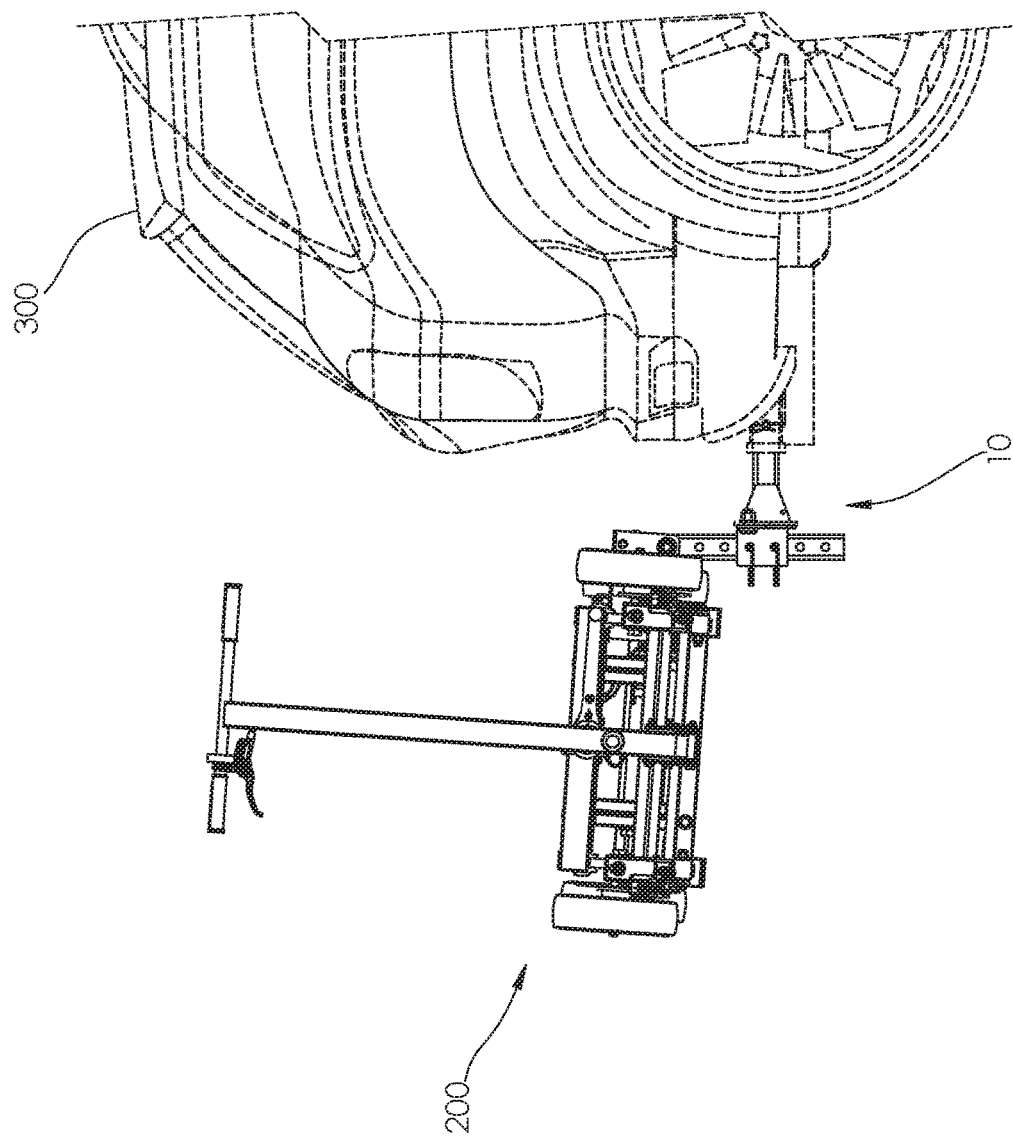
FIG. 7 illustrates a side view of the scissor lift cart in a fully compressed configuration mounted on the hitch adapter assembly of FIG. 1, with wheel assemblies rotated up for clearance.

The cart 200 is now in its correct transport position (FIG. 6). The cart wheel assemblies 210, 212 may then be rotated to their stowed position for additional off-road clearance (FIG. 7). Further modifications to the wheel assemblies 210, 212 may provide for the use of a pneumatically or electrically powered system for automatically raising the wheel assemblies 210, 212.

6. Pitch Mounting Angle

Referring to FIG. 8 through FIG. 12, several types of mechanisms may be used to provide for the pitch mounting angle 172 of the mounting box assembly 160 and attached cart 200 to be adjusted to the proper orientation toward the vehicle 300.

Figure 8:
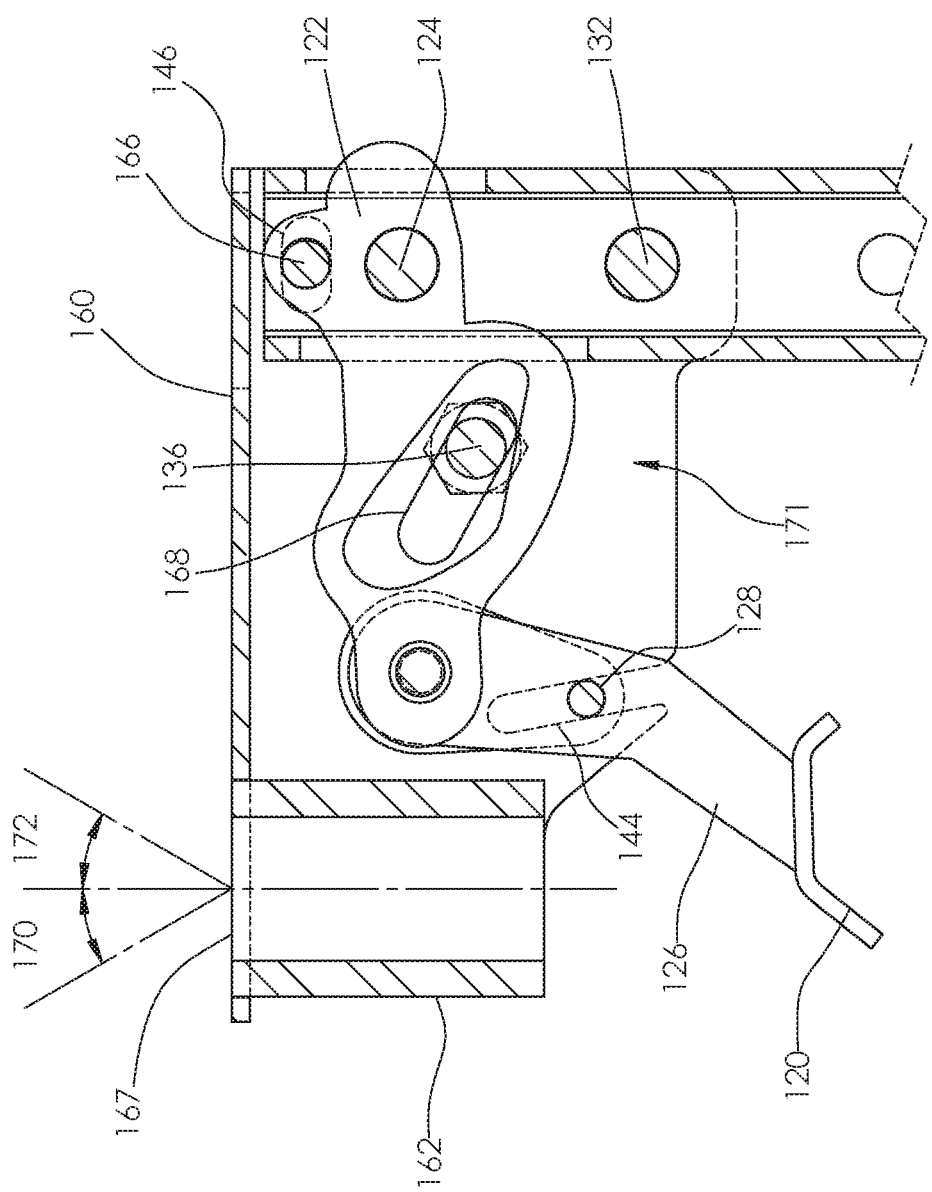
FIG. 8 is a side-section view of the pitch box and manually adjusted pitch stop bolt of the hitch adapter assembly of FIG. 1.

In one embodiment, and as illustrated in FIG. 8, the forward pitch mounting angle 172 is preferably up to 12 degrees (or 12 degrees clockwise as viewed in FIG. 8) from the vertical axis with a variance of plus or minus 6 degrees.

The rearward pitch angle 170 is established by the limits of travel of link pin 166 within the confines of the arched slot 146 in the height adjustment post 32, and has a preferred angle of up to 5 degrees rearward pitch mounting angle 170 (or counterclockwise as viewed in FIG. 8) from the vertical axis with a variance of plus or minus 4 degrees.

The rearward pitch mounting angle 170 and forward pitch mounting angle 172 both allow for movability or free play of the mounting box assembly 160. Accordingly, this movability or free play allows the mounting box assembly 160 to move relative to the load pin 202 of the cart 200 during the process of loading the cart 200 onto the vehicle hitch adapter 10 when coupled to the vehicle 300, thereby providing correct pin alignment means for aligning the load pin 202 of the cart 200 with the vertical receiver tube 162 of the mounting box assembly 160 so that the load pin 202 can be easily received therein without binding for coupling the cart 200 to the rear of the vehicle 300 via the hitch adapter 10.

In the embodiment of FIG. 8, the forward pitch 172 is established by the rotation of the pitch lever 122 being limited by a pitch bolt 136, which is compressively fixed in position within two slots 168 (FIG. 2) in the side walls of the mounting box 160. Forward tilt 172 of the mounting box 160 can be adjusted by loosening the pitch bolt 136 and repositioning it within the two slots 168 to change the stop point of the pitch lever 122 and thereby the final forward pitch angle 172 of the mounting box 160 and attached scissor lift cart 200.

In the embodiment of FIG. 9, the forward pitch 172 is established with the use of an eccentric bolt 150 which is compressively fixed in position through two holes 151 in the mounting box 160. Forward tilt 172 of the mounting box 160 can be adjusted by loosening the eccentric bolt 150 with two wrenches and rotating it within its two holes 151 to change the stop point of the pitch lever 122 and thereby the final forward pitch angle 172 of the mounting box 160 and attached scissor lift cart 200.

Figure 12:
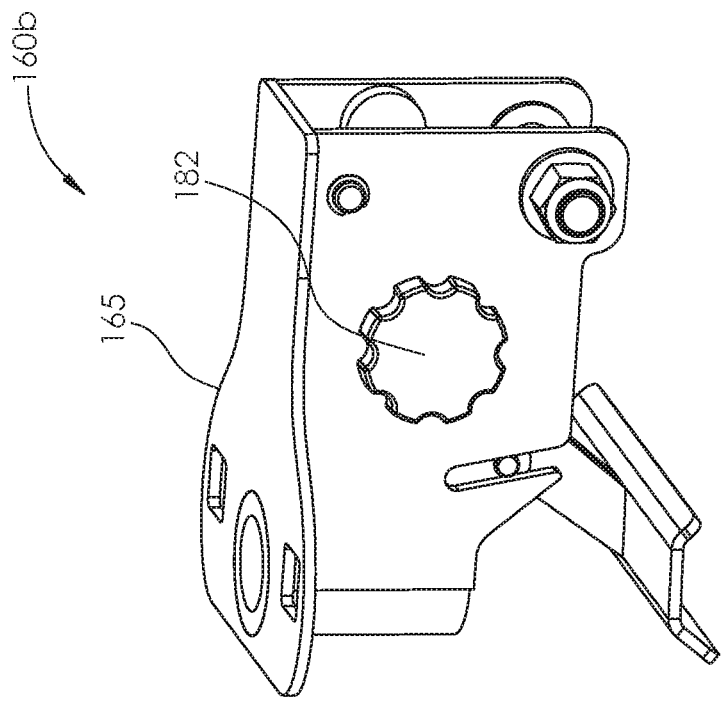
FIG. 12 shows a perspective view of a pitch box assembly box with manual eccentric bolt pitch control adjustment.

In a further embodiment shown in FIG. 12, the forward pitch 172 is established with the use of an eccentric shaft assembly which is positioned through two holes in the mounting box 160b by a manual knob 182.

In a further embodiment shown in FIG. 11, mounting box 160a having an electric geared or stepper motor (not shown) is incorporated within the pitch control manager 180 or similar electronic signal directed device. An electronic attitude sensing device located within the pitch control manager 180, such as a 3-axis accelerometer/attitude sensor, may be installed in either the hitch adapter 160a, in the cart 200 (e.g. logic module 228 in FIG. 3), or both, with the two units electrically tethered by radio or infrared optical digital communication. These units may also communicate with the carrying vehicle, another computer via WIFI, cellular, radio or satellite, or with an operator's device such as a cell phone to transfer data such as vehicle type, current load, suspension characteristics, payload type and weight, etc. These communications modules may also fall into the class of devices currently called Internet of Things (loT). Forward tilt 172 of the mounting box 160a is adjusted when the cart attitude sensor 228 determines the sag angle of the cart 200 as it is being mounted to the hitch adapter 10 and sends the sag angle of the cart 200 to the pitch control manager 180. The pitch control manager 180 compares the attitude of the cart 200 with the attitude of the mounting box 160 and determines the correct rotation required of the eccentric shaft to result in the correct cart carrying angle. The pitch control manager 180 then sends the appropriate control signal to the stepper motor (not shown) or other appropriate eccentric shaft positioning device within the pitch control manager 180 to rotate the eccentric shaft to the correct position. This changes the stop point of the pitch lever 122 and thereby the final forward pitch angle 172 of the mounting box 160 and attached scissor lift cart 200. In a preferred embodiment, the pitch control manager 180 (or cart logic module 228) comprises memory storing application programming or instructions executable on a processor for performing the above functions, or functions relating to dynamic payload leveling and/or load sensing detailed below, or any function provided by cart logic module 228.

It is appreciated to those of skill in the art that other means of positioning a mechanical stop point may also be used.

7. Cart Vibration and Impact Force Dampening System

When mounted, the cart 200 maintains a strong compressive force on the push arm 126 to maintain the correct forward tilt angle of the cart 200. Under vertical acceleration forces caused by road irregularities, the carrying vehicle 300 and attached hitch adapter 10 are abruptly forced upward, effectively increasing the acceleration induced weight of the cart 200 and attached payload 244 due to inertia. The energy of the mass in motion of the cart 200 and payload 244 is translated to kinetic energy through the mounting box 10, through the pitch lever 122, and push arm 126 to the lower frame 208 of the cart 200. The extension of the push arm 126 spreads the upper cart frame 204 and lower cart frame 208 slightly apart. This displacement translates through the scissor lift system 230 to the dampening spring 220 under the operating handle 206 and is absorbed by the dampening spring 220. As quickly as the dampening spring 220 absorbs the kinetic energy and converts it to potential energy, it releases the stored energy back into the scissor lift mechanism 230 and causes it to compress harder onto the push arm 126 and return the cart 200 to its original position. This overall dampening system helps attenuate the felt acceleration on the cart 200, and thereby on the payload 244 carried by the cart 200, reducing the potential for damage to the payload 244 and the cart 200.

8. Cart Bounce Restraint

To facilitate loading and unloading of the cart 200 to the hitch adapter 10 with minimal binding, the load pin 202 (FIG. 10) is preferably a smaller diameter (i.e. some degree of loose fit) than the associated mating aperture 167 of the vertical receiver tube 162 in the mounting box 160. When suspended, the cart 200 causes the load pin 202 to assume a rearward pitch within the vertical receiver tube 162. This angle is maintained by the weight of the cart 200 and attached payload 244. An undesirable side effect of this loose fit in the prior art is that a bump in the road such as a speed bump translates through the carrying vehicle 300 to the hitch adapter and thereby into the cantilever-supported cart or cargo. Because of the loose fit of the load pin 202 in the vertical receiver tube 162, the load pin 202 and the attached cart 200 are free to rotate forward (clockwise as viewed in FIG. 10) until the walls of the vertical receiver tube 162 stop the load pin 202 forward rotation. In certain situations, this may result in the payload 244 attached to the cart 200 striking the carrying vehicle 300, causing damage to the vehicle 300 or the cart payload 244. The cart 200 then freely accelerates due to gravity and rebound force back to its normal carrying position. The momentum of the cart 200 returning to its carry position imparts a higher than normal load on the hitch adapter 10 as the vertical pin receiver 162 stops the load pin 202. This amplified load may cause damage to the hitch adapter 10 as well as imparts a forceful jolt to the carrying vehicle 300. This jolt can be distracting to the driver and may cause adverse vehicle control issues.

To prevent this undesirable bounce as seen in the prior art, the lower frame rail 208 of the cart is restrained from rearward motion by the formed bracket 120 on the bottom of the push arm 126. This restraint of the lower cart frame 208 causes the load pin 202 to be bound in its rearward most position within the vertical receiver tube 162, thereby preventing the cart 200 from rotating any further forward and preventing road bump induced pitch and the undesirable results of that pitch.

An additional feature to equip the cart 200 for this increased stability is that the upper cart frame 204 and the lower cart frame 208 are ideally rigidly affixed together to prevent the horizontal shear forces induced by the bounce restraint system from damaging the cart scissor lift mechanism 230 and any of the components therein. One embodiment of such a shear force compensator is rigid post saddles 214 (FIG. 3) attached to the tops of the frame posts 216 to lock the upper cart frame 204 in horizontal position relative to the lower cart frame 208 when the scissor lift 230 is fully compressed on the hitch adapter mounting box 160 (as seen in FIG. 6). The post saddles 214 bind the cart frames 204, 208 so that they are relationally locked together to protect the cart scissor lift mechanism 230 and any of the components therein from shear force damage.

A further advantage of the rigid saddles 214 combined with the compressive capability of the scissor lift 230 is that the cart 200 locks itself into a tight, rigid bundle when fully collapsed. This is the desired condition for meeting criterion necessary to allow the system to be rigged with a harness and thereby attached to a helicopter for delivery into remote areas or onto rooftops.

9. Nesting Wheels

If further ground clearance is needed, the fixed end wheels 210 transform or pivot from a down position as illustrated in FIG. 3 to a folded up or nested position above the lower frame 208 as illustrated in FIG. 7.

Figure 14:
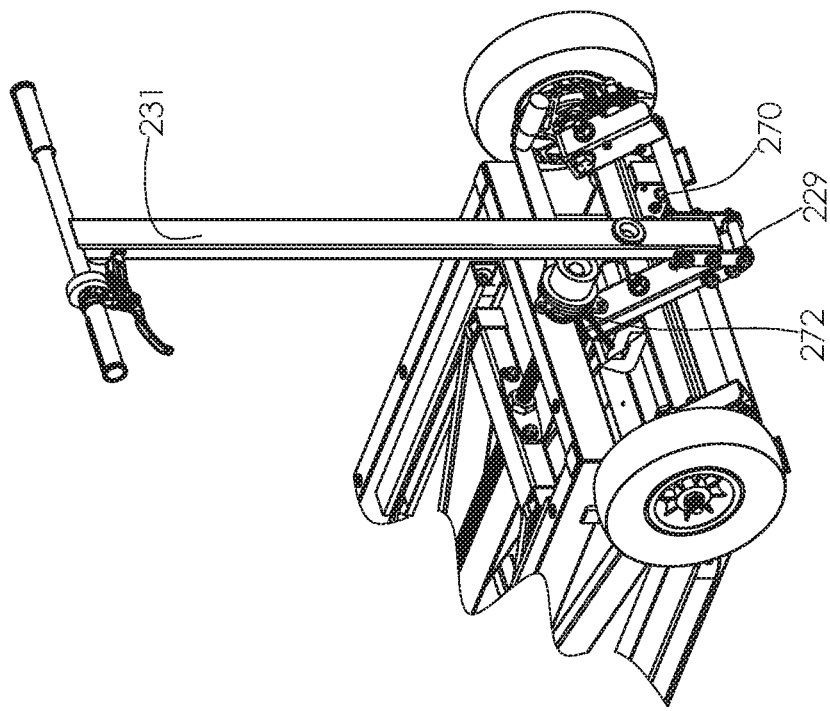
FIG. 14 shows a perspective view of the scissor lift cart with raised wheel assembly.
Figure 13:
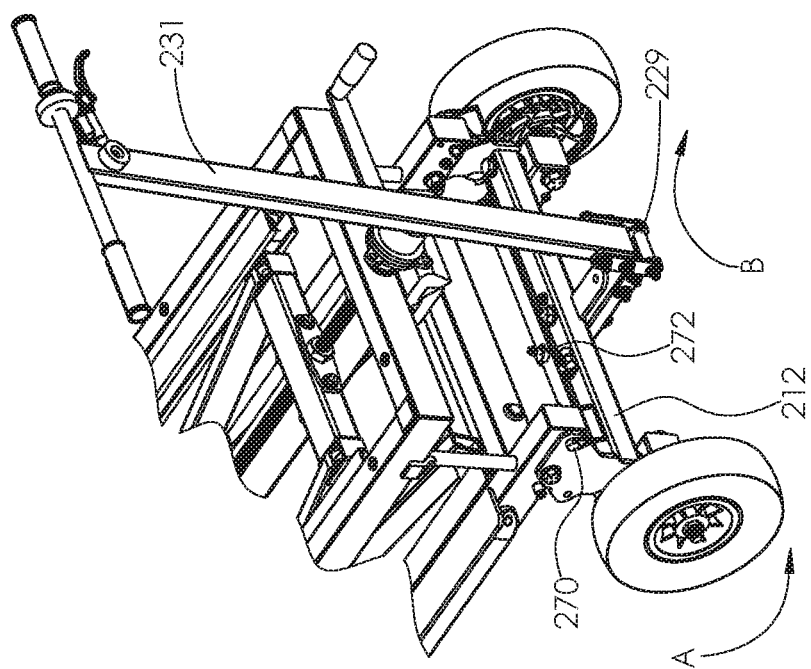
FIG. 13 shows a perspective view of the scissor lift cart with lowered wheel assembly.

Referring to FIG. 13, the steering end wheels 212 can be nested in the up position by removing each leg pin 270, and the steering lock pin 272. Then, rotate the steering end wheels 212 to their stored position (shown in FIG. 14, FIG. 7, the T-bar steerer 231 also rotates about joint 229) and replacing the leg pins 270 and steering lock pin 272. Further modifications to the wheel assemblies 210, 212 may provide for the use of a pneumatically or electrically powered system (not shown) for automatically raising the wheel assemblies 210, 212.

Accordingly, the nesting of the wheel provides additional ground clearance for transport safety, and for a flush planar surface defined by the lower surface of the lower frame assembly 208 to enable cart 200 transport on pallets or skids.

10. Use Cases

Referring to FIG. 15 through FIG. 19, an additional methodology of use for the system is for the convenient delivery of parcels or packages by anyone with a load bearing hitch mechanism on the back of their vehicle. The describes methodology enables a convenient, lower cost method of completing the challenging "last mile" delivery and pick-up of parcels. Items such as parcels, food (cold, hot, prepared, "take-out"), groceries, and other items which fit into the emerging business models of "deliverables".

One embodiment of such a system would have a parcel delivery company such as UPS, FedEx or Amazon sort parcels in their distribution center by route and weight. The parcels would then be loaded into payload containers 244, which could be delivered by truck to a location within a parcel delivery area along with a cart 200 and hitch adapter 10. As shown in FIG. 17 to FIG. 19, the payloads 244 may be stored on a rack 250, which is elevated to a position where the cart 200 could roll below the payloads 244. A driver, either independent or employed by the delivery company or in a contractual relationship with a company such as UBER or LYFT would arrive at the location and install the hitch adapter 10 into their hitch receiver 302 as described above. They would then roll the cart 200 below the first rack 250 mounted payload 244 (FIG. 17) and elevate the cart 200 to engage and lift the payload 244 off of the rack 250 (FIG. 18). In one embodiment, the payload 244 would automatically lock onto cart 200, while an electronic module within the payload 244 would "handshake" or digitally communicate with the logic module 228 (FIG. 3) within the cart 200, and through the logic module 228 then communicate with another device such as the vehicle operator's cell phone. The operator may also scan a barcode on the payload 244 for identification. When the payload 244 is lifted off the rack 250 by the cart 200, it can be moved away from the rack 250 and lowered for stable transport to the carrying vehicle 300 (FIG. 19). The cart 200 and payload 244 may then be mounted in the correct fashion to the carrying vehicle 300 as described above.

The operator may have a device such as a cell phone or other connected device such as a tablet which will have an "app" which can identify the payload 244 selected and communicate with the delivery company computers to download the correct delivery route to drive, addresses of the scheduled deliveries, and other associated data to enable parcel scanning and delivery. During the delivery process, load cells 234 cart logic module within the payload 244 (FIG. 15) or on the cart 200 (FIG. 3, 232) may monitor the changes in weight of the payload 244 to ensure that the proper parcel is being delivered, that too many parcels have not been removed, and direct the operator to redistribute heavy objects within the payload 244 to enable a safe balance of the payload 244 for transport so as to not adversely affect the safe operations of the carrying vehicle. The operator may also collect parcels for shipment, scanning them into the delivery company computers with his cell phone app, and placing them into the payload 244 where the load cells 232 or 234 would register the parcel weight and check it against the electronic shipment records.

During this process, the overall weight of the payload 244 will vary, but typically decrease by several hundreds of pounds (kilos). This decreased weight will change the amount of sag deflection of the carrying vehicle by a varying amount based on the type of carrying vehicle. A feature of the system is that the level sensors in the cart logic module (FIG. 3, 228) will constantly monitor these changes and may communicate with a logic device (FIG. 11, 180) within the hitch adapter 10 to dynamically adjust the correct pitch angle of the hitch adapter 10 and attached cart 200 and payload 244 to ensure the safe transport of the cart 200 and payload 244.

Figure 15:
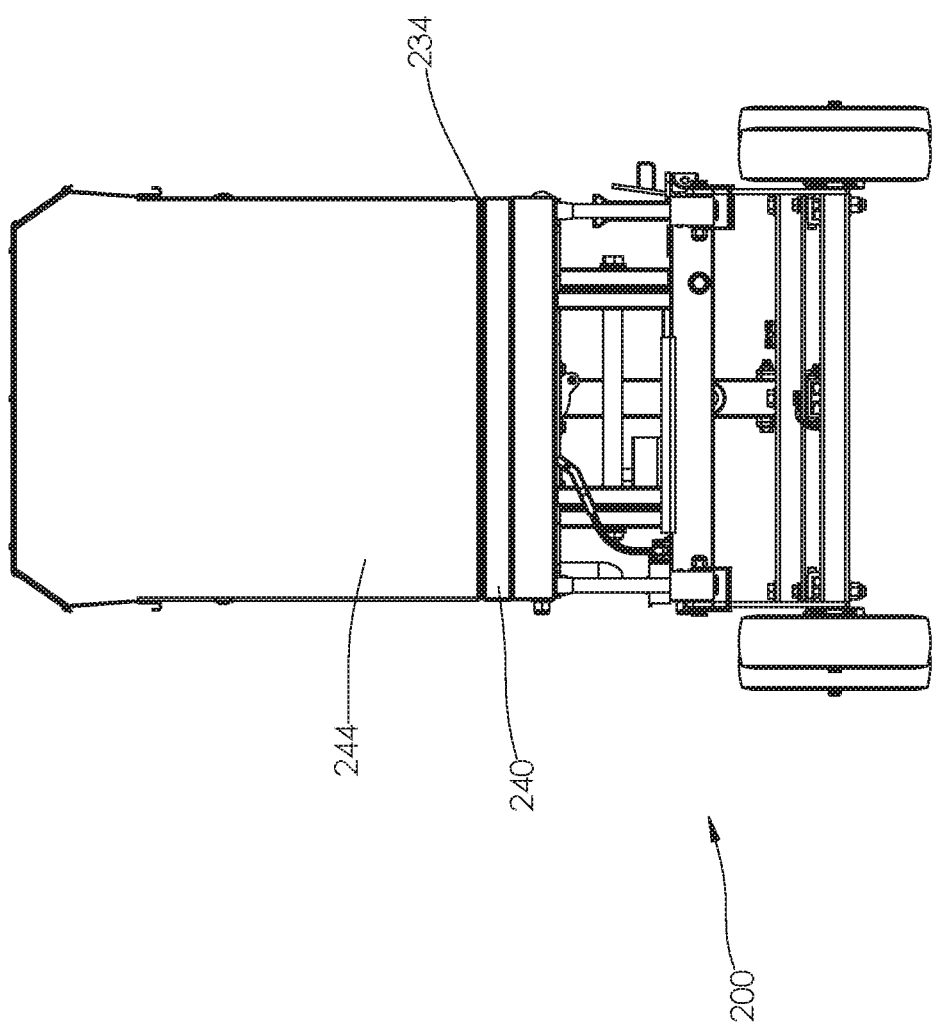
FIG. 15 shows a front view of the scissor lift cart of FIG. 3 with a payload attached to the cart.

Referring to FIG. 15 and FIG. 16, the payload may also contain a separate frame 240 and powered struts or extenders 242 to automatically level the payload 244 as directed by the cart logic module level sensors (FIG. 3, 228) when the carrying vehicle 300 is parked on a slope that might cause parcels to tumble out of the payload 244 when opened.

When the operator has completed the assigned route for the loaded payload 244, he would unload the cart 200 and payload 244 as described above, roll the cart 200 to rack 250, elevate payload 244 above the rack 250, roll the cart 200 under rack 250 and lower payload 244 until it disengages from cart 200 and nests in its place on rack 250. The operator may then select another payload 244 off rack 250, check the payload 244 into the delivery system as described above, and repeat the delivery process.

Such a system would involve communications capabilities between the payload 244, the cart 200 and possibly the hitch adapter 10. Many types of communications devices may be used to communicate need data. They may include a traditional wired circuit (not shown), which may be connected by the operator, or wireless means such as Wi-Fi, radio, Bluetooth, cellular signal, satellite or other method.

These devices would utilize power supplies, which in one embodiment may be provided by rechargeable battery packs (not shown). Described above is a system where Direct Current (DC) power, which is typically 12 volts but may be any voltage, is transmitted to the hitch adapter 10 by a wiring harness (not shown) connected to the carrying vehicle 300 electrical system. A device such as a static inverter within the hitch adapter 10 can convert the DC current into Alternating Current (AC). This AC current may then be transmitted to the cart logic module 228 and any potential payload 244 logic modules via a system of inductive coils between the hitch adapter 10, cart 200 and payload 244. The AC current could be used to power the logic circuits, communication devices and other devices, or converted back to DC current with a device such as a rectifier. The DC current could then be used to charge and maintain the efficacy of the assorted system batteries.

Another provided capability of the system is the ability to dynamically level the cart 200 and attached payload 244 to provide a level surface to the payload 244 when the carrying vehicle 300 is parked on an incline. FIG. 21 exhibits an example of a radio communications module 244 before leveling of the cart 200 and the detrimental affect it has on the required vertical deployment of a communications mast 246. FIG. 22 illustrates the same application after leveling of the cart 200 and attached communications payload 244 with optimum vertical deployment of the communications mast 246.

The above delineations of vehicle hitch adapter 10, scissor lift cart 200, and some representative payloads 244, including their use and operation, demonstrates the industrial applicability of systems described herein.

11. Example Materials

In one embodiment, the scissor lift cart 200 frames are made from, but not limited to, 6061-T6 Aluminum tube, routed/milled and welded. The suspended load bearing portion of the scissor lift cart 200 may be constructed from heavy steel tubing and an 1144 steel load pin. The hitch adapter system 10 may be constructed from, but not limited to, steel, 1144 steel, T1 steel and AR400 steel, laser cut and welded. In one embodiment, all parts are powder coated for preservation and aesthetics. In one embodiment, the wheels are, but not limited to, solid urethane foam or rubber.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general-purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A variable pitch vehicle hitch adapter for carrying a cargo cart, comprising: a receiver tongue having a first end configured to be releasably received within a hitch receiver of the vehicle; an adjustment post having an elongated body extending between a top end and a bottom end; a mounting box comprising a cavity for receiving the top end of the adjustment post; the mounting box having an upper surface configured for receiving a first mounting surface of the cargo cart; wherein a second end of the receiver tongue is coupled to the adjustment post at a location between the top end and bottom end; and a pitch adjustment mechanism coupled to the mounting box, the pitch adjustment mechanism configured to provide for adjustment of a pitch mounting angle between the cargo cart and the vehicle.

2. The apparatus or method of any preceding or following embodiment, wherein the pitch adjustment mechanism comprises: a pitch-stop bolt fixed in position within two slots in opposing side walls of the mounting box assembly; and a pitch lever coupled to mounting box assembly via the pitch bolt; wherein the pitch mounting angle is adjusted by rotation of the pitch lever according to a path limited by the two slots in the mounting box.

3. The apparatus or method of any preceding or following embodiment, further comprising: a push arm coupled to the pitch lever; the push arm comprising an endplate disposed on the bottom of the push arm, the endplate configured to contact a second mounting surface of the cargo cart at spaced apart location from a first mounting surface; and wherein contraction of the cargo cart with respect to the second mounting surface toward the first mounting surface acts to align a pitch angle of the cargo cart with respect to the hitch adapter.

4. The apparatus or method of any preceding or following embodiment: wherein first mounting surface comprises an upper frame member and the second mounting surface comprises a lower frame member; and wherein the cargo cart comprises a scissor lift cargo cart comprising a scissor lift assembly mechanically coupling the lower frame member and upper frame member to allow for expansion and retraction of the lower frame member with respect to the upper frame member.

5. The apparatus or method of any preceding or following embodiment, wherein the push arm prevents undesirable bounce of the cargo cart by restraining rearward motion of the upper frame member with respect to the lower frame member.

6. The apparatus or method of any preceding or following embodiment, further comprising: a link pin and pivot pin coupled to the mounting box and pitch lever and a pitch bolt coupling the adjustment post to the mounting box; wherein upon motion of the second mounting surface toward the first mounting surface, the pitch lever is forced upwards from a force applied on the push arm endplate such that the pitch lever pivots around pivot pin and forces the link pin to move with amplified mechanical force increased by the moment arm of the pitch lever to force the mounting box and attached cargo cart to rotate around pitch bolt toward vehicle until it is stopped by the pitch stop bolt.

7. The apparatus or method of any preceding or following embodiment, wherein forward tilt of the mounting box with respect to the vehicle is manually adjusted by loosening the pitch stop bolt and repositioning it within the two slots to change the stop point of the pitch lever and thereby adjust the pitch mounting angle between the cargo cart and the vehicle.

8. The apparatus or method of any preceding or following embodiment, wherein the pitch stop bolt comprises an eccentrically positioned pitch bolt shaft, the hitch adapter further comprising: an electronic pitch control manager coupled to the pitch stop bolt; wherein the electronic pitch control manager is configured to acquire attitude data relating to one or more of the cargo cart and mounting box and rotates the eccentrically positioned pitch bolt shaft to a position that alters the stop point of the pitch lever to thereby alter a final forward pitch angle of the mounting box and attached cargo cart.

9. The apparatus or method of any preceding or following embodiment, wherein the adjustment post comprises a height adjustment post slideably coupled to the second end of the receiver tongue via a height adjustment receiver; the height adjustment post comprising an array of pairs of opposing spaced apart height adjustment apertures disposed along a longitudinal length of a body of said height adjustment post such that the height of the mounting box may be adjusted by sliding the height adjustment post within the height adjustment receiver.

10. The apparatus or method of any preceding or following embodiment, wherein the height adjustment receiver is attached to the receiver tongue via a roll support plate having bolt slots for coupling roll adjustment bolts, thereby allowing adjustment of a roll position of the cargo cart to compensate for any rotational disparities between the vehicle hitch receiver and the vehicle.

11. The apparatus or method of any preceding or following embodiment, wherein the upper surface of the mounting box comprises a circular aperture and a tab aperture adjacent the circular aperture; wherein the circular aperture opens to a pin receiving passageway having a central vertical axis within the mounting box, the pin receiving passageway configured for receiving a mounting pin fixed to the cargo cart in a downward orientation at the first mounting surface; wherein the tab aperture is configured to receive a tab fixed to the cargo cart in a downward orientation a specified distance from the mounting pin; wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter; wherein the upper surface is configured to support the cargo cart in a suspended configuration; wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

12. The apparatus or method of any preceding or following embodiment, wherein rotation of the cargo cart with respect to the vehicle hitch adapter about the central axis is locked upon full advancement of the tab within the tab aperture.

13. A cargo system for removably coupling a cargo cart to a hitch receiver of a vehicle, comprising: (a) a cargo cart, comprising: (i) an upper frame member comprising a first mounting surface; (ii) a lower frame member comprising a second mounting surface; (iii) wherein the lower frame member is configured to vertically translate with respect to the upper frame member; (b) a variable pitch vehicle hitch adapter, comprising: (i) a receiver tongue having a first end configured to be releasably received within a hitch receiver of the vehicle; (ii) an adjustment post having an elongated body extending between a top end and a bottom end; (iii) a mounting box comprising a cavity for receiving the top end of the adjustment post; (iv) the mounting box having an upper surface configured for receiving the first mounting surface of the cargo cart; (v) wherein a second end of the receiver tongue is coupled to the adjustment post at a location between the top end and bottom end; and (vi) a pitch adjustment mechanism coupled to the mounting box, the pitch adjustment mechanism configured to provide for adjustment of a pitch mounting angle between the cargo cart and the vehicle.

14. The apparatus or method of any preceding or following embodiment, wherein the pitch adjustment mechanism comprises: a pitch-stop bolt fixed in position within two slots in opposing side walls of the mounting box assembly; and a pitch lever coupled to mounting box assembly via the pitch bolt; wherein the pitch mounting angle is adjusted by rotation of the pitch lever according to a path limited by the two slots in the mounting box.

15. The apparatus or method of any preceding or following embodiment: wherein the cargo cart comprises a scissor lift cargo cart comprising a scissor lift assembly mechanically coupling the lower frame member and upper frame member to allow for expansion and retraction of the lower frame member with respect to the upper frame member; wherein the hitch adapter further comprises a push arm coupled to the pitch lever; the push arm comprising an endplate disposed on the bottom of the push arm, the endplate configured to contact the second mounting surface of the cargo cart at a spaced apart location from a first mounting surface; and wherein contraction of cart with respect to the second mounting surface toward the first mounting surface acts to align a pitch angle of the cargo cart with respect to the hitch adapter.

16. The apparatus or method of any preceding or following embodiment: (c) the cargo cart further comprising: (iv) a mounting pin in a downward orientation fixed to the cargo cart at the first mounting surface; and (v) a tab fixed to the cargo cart in a downward orientation a specified distance from the mounting pin; (d) the vehicle hitch adapter further comprising; (vii) the mounting box comprising an upper surface comprising a circular aperture and a tab aperture adjacent the circular aperture; (viii) wherein the circular aperture opens to a pin receiving passageway having a central vertical axis within the mounting box, the pin receiving passageway configured for receiving the mounting pin of the cargo cart; (ix) wherein the tab aperture is configured to receive the tab of the cargo cart; (x) wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter; and (xi) wherein the upper surface is configured to support the cargo cart in a suspended configuration; (e) wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and (f) wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

17. The apparatus or method of any preceding or following embodiment, wherein the scissor lift assembly is configured to lower the upper frame member in relation to the lower frame member to initiate said downward extension of the mounting pin into the receiving passageway.

18. The apparatus or method of any preceding or following embodiment, wherein continued lowering of the upper frame member in relation to the lower frame member positions the lower frame member to contact the push arm endplate at the second mounting location to restrain rearward motion of the upper frame member with respect to the lower frame member.

19. The apparatus or method of any preceding or following embodiment, further comprising: a link pin and pivot pin coupled to the mounting box and pitch lever and a pitch bolt coupling the adjustment post to the mounting box; wherein upon motion of the second mounting surface toward the first mounting surface, the pitch lever is forced upwards from a force applied on the push arm endplate such that the pitch lever pivots around pivot pin and forces the link pin to move with amplified mechanical force increased by the moment arm of the pitch lever to force the mounting box and attached cargo cart to rotate around pitch bolt toward vehicle until it is stopped by the pitch stop bolt.

20. The apparatus or method of any preceding or following embodiment, wherein forward tilt of the mounting box with respect to the vehicle is manually adjusted by loosening the pitch stop bolt and repositioning it within the two slots to change the stop point of the pitch lever and thereby adjust the pitch mounting angle between the cargo cart and the vehicle.

21. The apparatus or method of any preceding or following embodiment, wherein the pitch stop bolt comprises an eccentrically positioned pitch bolt shaft, the hitch adapter further comprising: an electronic pitch control manager coupled to the pitch stop bolt; wherein the electronic pitch control manager is configured to acquire attitude data relating to one or more of the cargo cart and mounting box and rotates the eccentrically positioned pitch bolt shaft to a position that alters the stop point of the pitch lever to thereby alter a final forward pitch angle of the mounting box and attached cargo cart.

22. A scissor lift cargo cart configured for mounting to a vehicle hitch receiver, comprising: an upper frame member comprising a first mounting surface; a lower frame member comprising a second mounting surface; a scissor lift assembly coupling the upper frame member to the lower frame member; the scissor lift assembly configured to drive expansion and retraction of the lower frame member with respect to the upper frame member; wherein the first mounting surface is configured to be received on a mounting box of a hitch adapter coupled to the vehicle hitch receiver; and wherein, as a result of contraction of the scissor lift assembly to retract the upper frame member with respect to the lower frame member, the second mounting surface is configured to engage a second location on the hitch adapter at a spaced-apart location from the first mounting surface.

23. The apparatus or method of any preceding or following embodiment, wherein contraction of the scissor lift assembly with respect to the second mounting surface toward the first mounting surface acts to align a pitch angle of the cargo cart with respect to the hitch adapter.

24. The apparatus or method of any preceding or following embodiment: wherein the upper frame member comprises a mounting pin fixed to the cargo cart at the first mounting surface in a downward orientation and a tab fixed to the cargo cart in a downward orientation a specified distance from the mounting pin; wherein the first mounting surface of the mounting box comprises an upper surface comprising a circular aperture and a tab aperture adjacent the circular aperture; wherein the circular aperture opens to a pin receiving passageway having a central vertical axis within the mounting box, the pin receiving passageway configured for receiving the mounting pin of the cargo cart; wherein the tab aperture is configured to receive the tab of the cargo cart; wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter; and wherein the upper surface is configured to support the cargo cart in a suspended configuration; wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

25. The apparatus or method of any preceding or following embodiment, wherein scissor lift assembly comprises two pairs of sliders that are mechanically supported in opposing pairs of slide channels in upper frame members and lower frame members.

26. The apparatus or method of any preceding or following embodiment: a first pair of wheels pivotably coupled to a steering end of said lower frame member; a second pair of wheels pivotably coupled to a tail end of said lower frame member; wherein said first pair of wheels and said second pair of wheels are configured to pivot between a use position vertically below a lower planar bottom surface of said lower frame member and a transport position vertically above said lower planar bottom surface of said lower frame member.

27. The apparatus or method of any preceding or following embodiment: wherein the upper frame member is configured to receive a payload; wherein an upper surface of the upper frame member comprises one or more load cells coupled to a logic module to monitor any changes in the weight of the payload.

28. The apparatus or method of any preceding or following embodiment, further comprising: one or more saddles vertically extending upward from the lower frame member; wherein the one or more saddles are configured to engage the upper frame member upon retraction of the upper frame with respect to the lower frame; wherein the one or more saddles rigidly fix the upper frame with respect to the lower frame to protect the scissor lift mechanism from potential shear force damage during travel of the vehicle.

29. A variable pitch vehicle hitch mounted carrying system for a scissor lift carts, comprising: a receiver tongue configured to be inserted into hitch receiver tube of a vehicle; a height adjustment post slideably coupled to the receiver tongue via a height adjustment receiver; wherein the a top end of the height adjustment post is configured to couple to a vertical receiver tube, such that the height of the receiver tube may be adjusted by sliding the height adjustment post within the height adjustment receiver; wherein the vertical receiver tube is configured for receiving a load pin of a scissor lift cart; and a pitch adjustment mechanism to provide for adjustment of a pitch mounting angle between the attached scissor lift cart and the vehicle.

30. The system of any preceding or following embodiment, wherein the pitch adjustment mechanism comprises: a mounting box assembly housing the vertical receiver tube: a pitch bolt compressively fixed in position within two slots of the mounting box assembly, and a pitch lever coupled to mounting box assembly via a pivot pin, link pin and the pitch bolt; wherein the pitch mounting angle is adjusted by rotation of the pitch lever according to a path limited by the two slots in the mounting box.

31. The system of any preceding or following embodiment, further comprising: a push arm coupled to the pitch lever; the push arm comprising a bracket disposed on the bottom of the push arm configured to a frame rail of the cart; wherein the push arm prevents undesirable bounce of the cart by restraining rearward motion of the formed bracket.

32. The system of any preceding or following embodiment, wherein the vertical receiver tube is attached to the receiver tongue via roll support plate having bolt slots for coupling roll adjustment bolts, thereby allowing adjustment of a roll position of the cart to compensate for inherent rotational disparities between the vehicle hitch receiver tube and the vehicle so that the carried cart is in rotational alignment with the carrying vehicle.

33. A method for coupling a variable pitch vehicle hitch adapter to a vehicle and a cargo cart, comprising: releasably receiving a first end of a receiver tongue within a hitch receiver of the vehicle; the hitch receiver comprising an adjustment post having an elongated body extending between a top end and a bottom end and a mounting box comprising a cavity for receiving the top end of the adjustment post; receiving a first mounting surface of the cargo cart on an upper surface of the mounting box; wherein a second end of the receiver tongue is coupled to the adjustment post at a location between the top end and bottom end and a pitch adjustment mechanism is coupled to the mounting box, the pitch adjustment mechanism configured to provide for adjustment of a pitch mounting angle between the cargo cart and the vehicle.

34. A method for variable pitch mounting of a scissor lift cart to a hitch adapter and a vehicle hitch receiver using the system of any of the preceding embodiments.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A variable pitch vehicle hitch adapter for carrying a cargo cart, comprising:
    a receiver tongue having a first end configured to be releasably received within a hitch receiver of the vehicle;
    an adjustment post having an elongated body extending between a top end and a bottom end;
    a mounting box comprising a cavity for receiving the top end of the adjustment post;
    the mounting box having an upper surface configured for receiving a first mounting surface of the cargo cart;
    wherein a second end of the receiver tongue is coupled to the adjustment post at a location between the top end and bottom end; and
    a pitch adjustment mechanism coupled to the mounting box, the pitch adjustment mechanism configured to provide for adjustment of a pitch mounting angle between the cargo cart and the vehicle;
    wherein the pitch adjustment mechanism comprises:

a pitch-stop bolt fixed in position within two slots in opposing side walls of the mounting box assembly; and a pitch lever coupled to mounting box assembly via the pitch bolt; and wherein the pitch mounting angle is adjusted by rotation of the pitch lever according to a path limited by the two slots in the mounting box.

2. The hitch adapter of claim 1, further comprising:

a push arm coupled to the pitch lever;

the push arm comprising an endplate disposed on the bottom of the push arm, the endplate configured to contact a second mounting surface of the cargo cart at spaced apart location from a first mounting surface; and wherein contraction of the cargo cart with respect to the second mounting surface toward the first mounting surface acts to align a pitch angle of the cargo cart with respect to the hitch adapter.

3. The hitch adapter of claim 2:

wherein first mounting surface comprises an upper frame member and the second mounting surface comprises a lower frame member; and wherein the cargo cart comprises a scissor lift cargo cart comprising a scissor lift assembly mechanically coupling the lower frame member and upper frame member to allow for expansion and retraction of the lower frame member with respect to the upper frame member.

4. The hitch adapter of claim 3, wherein the push arm prevents undesirable bounce of the cargo cart by restraining rearward motion of the upper frame member with respect to the lower frame member.

5. The hitch adapter of claim 3, further comprising:

a link pin and pivot pin coupled to the mounting box and pitch lever and a pitch bolt coupling the adjustment post to the mounting box;

wherein upon motion of the second mounting surface toward the first mounting surface, the pitch lever is forced upwards from a force applied on the push arm endplate such that the pitch lever pivots around pivot pin and forces the link pin to move with amplified mechanical force increased by the moment arm of the pitch lever to force the mounting box and attached cargo cart to rotate around pitch bolt toward vehicle until it is stopped by the pitch stop bolt.

6. The hitch adapter of claim 5, wherein forward tilt of the mounting box with respect to the vehicle is manually adjusted by loosening the pitch stop bolt and repositioning it within the two slots to change the stop point of the pitch lever and thereby adjust the pitch mounting angle between the cargo cart and the vehicle.

7. The hitch adapter of claim 5, wherein the pitch stop bolt comprises an eccentrically positioned pitch bolt shaft, the hitch adapter further comprising:

an electronic pitch control manager coupled to the pitch stop bolt;

wherein the electronic pitch control manager is configured to acquire attitude data relating to one or more of the cargo cart and mounting box and rotates the eccentrically positioned pitch bolt shaft to a position that alters the stop point of the pitch lever to thereby alter a final forward pitch angle of the mounting box and attached cargo cart.

8. The hitch adapter of claim 1, wherein the adjustment post comprises a height adjustment post slideably coupled to the second end of the receiver tongue via a height adjustment receiver;

the height adjustment post comprising an array of pairs of opposing spaced apart height adjustment apertures disposed along a longitudinal length of a body of said height adjustment post such that the height of the mounting box may be adjusted by sliding the height adjustment post within the height adjustment receiver.

9. The hitch adapter of claim 8, wherein the height adjustment receiver is attached to the receiver tongue via a roll support plate having bolt slots for coupling roll adjustment bolts, thereby allowing adjustment of a roll position of the cargo cart to compensate for any rotational disparities between the vehicle hitch receiver and the vehicle.

10. The hitch adapter of claim 1, wherein the upper surface of the mounting box comprises a circular aperture and a tab aperture adjacent the circular aperture;

wherein the circular aperture opens to a pin receiving passageway having a central vertical axis within the mounting box, the pin receiving passageway configured for receiving a mounting pin fixed to the cargo cart in a downward orientation at the first mounting surface;

wherein the tab aperture is configured to receive a tab fixed to the cargo cart in a downward orientation a specified distance from the mounting pin;

wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter;

wherein the upper surface is configured to support the cargo cart in a suspended configuration;

wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

11. The hitch adapter of claim 10, wherein rotation of the cargo cart with respect to the vehicle hitch adapter about the central axis is locked upon full advancement of the tab within the tab aperture.

12. A cargo system for removably coupling a cargo cart to a hitch receiver of a vehicle, comprising:

(a) a cargo cart, comprising:

(i) an upper frame member comprising a first mounting surface;

(ii) a lower frame member comprising a second mounting surface;

(iii) wherein the lower frame member is configured to vertically translate with respect to the upper frame member;

(b) a variable pitch vehicle hitch adapter, comprising:

(i) a receiver tongue having a first end configured to be releasably received within a hitch receiver of the vehicle;

(ii) an adjustment post having an elongated body extending between a top end and a bottom end;

(iii) a mounting box comprising a cavity for receiving the top end of the adjustment post;
(iv) the mounting box having an upper surface configured for receiving the first mounting surface of the cargo cart;
(v) wherein a second end of the receiver tongue is coupled to the adjustment post at a location between the top end and bottom end; and
(vi) a pitch adjustment mechanism coupled to the mounting box, the pitch adjustment mechanism configured to provide for adjustment of a pitch mounting angle between the cargo cart and the vehicle;
(c) wherein the pitch adjustment mechanism comprises:
   (i) a pitch-stop bolt fixed in position within two slots in opposing side walls of the mounting box assembly; and
   (ii) a pitch lever coupled to mounting box assembly via the pitch bolt; and
(d) wherein the pitch mounting angle is adjusted by rotation of the pitch lever according to a path limited by the two slots in the mounting box.

13. The system of claim 12:
(a) wherein the cargo cart further comprises a scissor lift cargo cart comprising a scissor lift assembly mechanically coupling the lower frame member and upper frame member to allow for expansion and retraction of the lower frame member with respect to the upper frame member;
(b) wherein the hitch adapter further comprises a push arm coupled to the pitch lever;
(c) the push arm comprising an endplate disposed on the bottom of the push arm, the endplate configured to contact the second mounting surface of the cargo cart at a spaced apart location from a first mounting surface; and
(d) wherein contraction of the cargo cart with respect to the second mounting surface toward the first mounting surface acts to align a pitch angle of the cargo cart with respect to the hitch adapter.

14. The system of claim 13:
(a) the cargo cart further comprising:
   (i) a mounting pin in a downward orientation fixed to the cargo cart at the first mounting surface; and
   (ii) a tab fixed to the cargo cart in a downward orientation a specified distance from the mounting pin;
(b) the vehicle hitch adapter further comprising;
   (iii) the mounting box comprising an upper surface comprising a circular aperture and a tab aperture adjacent the circular aperture;
   (iv) wherein the circular aperture opens to a pin receiving passageway having a central vertical axis within the mounting box, the pin receiving passageway configured for receiving the mounting pin of the cargo cart;
   (v) wherein the tab aperture is configured to receive the tab of the cargo cart;
   (vi) wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter; and
   (vii) wherein the upper surface is configured to support the cargo cart in a suspended configuration;
(c) wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and
(d) wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

15. The system of claim 14, wherein the scissor lift assembly is configured to lower the upper frame member in relation to the lower frame member to initiate said downward extension of the mounting pin into the receiving passageway.

16. The system of claim 15, wherein continued lowering of the upper frame member in relation to the lower frame member positions the lower frame member to contact the push arm endplate at the second mounting location to restrain rearward motion of the upper frame member with respect to the lower frame member.

17. The system of claim 13, further comprising:
a link pin and pivot pin coupled to the mounting box and pitch lever and a pitch bolt coupling the adjustment post to the mounting box;
wherein upon motion of the second mounting surface toward the first mounting surface, the pitch lever is forced upwards from a force applied on the push arm endplate such that the pitch lever pivots around pivot pin and forces the link pin to move with amplified mechanical force increased by the moment arm of the pitch lever to force the mounting box and attached cargo cart to rotate around pitch bolt toward vehicle until it is stopped by the pitch stop bolt.

18. The system of claim 17, wherein forward tilt of the mounting box with respect to the vehicle is manually adjusted by loosening the pitch stop bolt and repositioning it within the two slots to change the stop point of the pitch lever and thereby adjust the pitch mounting angle between the cargo cart and the vehicle.

19. The system of claim 17, wherein the pitch stop bolt comprises an eccentrically positioned pitch bolt shaft, the hitch adapter further comprising:
an electronic pitch control manager coupled to the pitch stop bolt;
wherein the electronic pitch control manager is configured to acquire attitude data relating to one or more of the cargo cart and mounting box and rotates the eccentrically positioned pitch bolt shaft to a position that alters the stop point of the pitch lever to thereby alter a final forward pitch angle of the mounting box and attached cargo cart.

20. A scissor lift cargo cart configured for mounting to a vehicle hitch receiver, comprising:
an upper frame member comprising a first mounting surface;
a lower frame member comprising a second mounting surface;
a scissor lift assembly coupling the upper frame member to the lower frame member;

the scissor lift assembly configured to drive expansion and retraction of the lower frame member with respect to the upper frame member;

wherein the first mounting surface is configured to be received on a mounting box of a hitch adapter coupled to the vehicle hitch receiver; and wherein, as a result of contraction of the scissor lift assembly to retract the upper frame member with respect to the lower frame member, the second mounting surface is configured to engage a second location on the hitch adapter at a spaced-apart location from the first mounting surface.

21. The scissor lift cargo cart of claim 20, wherein contraction of the scissor lift assembly with respect to the second mounting surface toward the first mounting surface acts to align a pitch angle of the cargo cart with respect to the hitch adapter.

22. The scissor lift cargo cart of claim 20:
wherein the upper frame member comprises a mounting pin fixed to the cargo cart at the first mounting surface in a downward orientation and a tab fixed to the cargo cart in a downward orientation a specified distance from the mounting pin;
wherein the first mounting surface of the mounting box comprises an upper surface comprising a circular aperture and a tab aperture adjacent the circular aperture;
wherein the circular aperture opens to a pin receiving passageway having a central vertical axis within the mounting box, the pin receiving passageway configured for receiving the mounting pin of the cargo cart;
wherein the tab aperture is configured to receive the tab of the cargo cart;
wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter; and
wherein the upper surface is configured to support the cargo cart in a suspended configuration;
wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and
wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

23. The scissor lift cargo cart of claim 20:
wherein scissor lift assembly comprises two pairs of sliders that are mechanically supported in opposing pairs of slide channels in upper frame members and lower frame members.

24. The scissor lift cargo cart of claim 20:
a first pair of wheels pivotably coupled to a steering end of said lower frame member;
a second pair of wheels pivotably coupled to a tail end of said lower frame member;
wherein said first pair of wheels and said second pair of wheels are configured to pivot between a use position vertically below a lower planar bottom surface of said lower frame member and a transport position vertically above said lower planar bottom surface of said lower frame member.

25. The scissor lift cargo cart of claim 20:
wherein the upper frame member is configured to receive a payload;
wherein an upper surface of the upper frame member comprises one or more load cells coupled to a logic module to monitor any changes in the weight of the payload.

26. The scissor lift cargo cart of claim 20, further comprising:
one or more saddles vertically extending upward from the lower frame member;
wherein the one or more saddles are configured to engage the upper frame member upon retraction of the upper frame with respect to the lower frame;
wherein the one or more saddles rigidly fix the upper frame with respect to the lower frame to protect the scissor lift mechanism from potential shear force damage during travel of the vehicle.

27. A variable pitch vehicle hitch adapter for carrying a cargo cart, comprising:
a receiver tongue having a first end configured to be releasably received within a hitch receiver of the vehicle;
an adjustment post having an elongated body extending between a top end and a bottom end;
a mounting box comprising a cavity for receiving the top end of the adjustment post;
the mounting box having an upper surface configured for receiving a first mounting surface of the cargo cart;
wherein a second end of the receiver tongue is coupled to the adjustment post at a location between the top end and bottom end; and
a pitch adjustment mechanism coupled to the mounting box, the pitch adjustment mechanism configured to provide for adjustment of a pitch mounting angle between the cargo cart and the vehicle;
wherein the upper surface of the mounting box comprises a circular aperture and a tab aperture adjacent the circular aperture;
wherein the circular aperture opens to a pin receiving passageway having a central vertical axis within the mounting box, the pin receiving passageway configured for receiving a mounting pin fixed to the cargo cart in a downward orientation at the first mounting surface;
wherein the tab aperture is configured to receive a tab fixed to the cargo cart in a downward orientation a specified distance from the mounting pin;
wherein the tab aperture and circular aperture are oriented on the upper surface at the specified distance to allow advancement of the tab into the tab aperture simultaneously with a portion of advancement of the mounting pin within the receiving passageway upon downward motion of at least a portion of the cargo cart with respect to the vehicle hitch adapter;
wherein the upper surface is configured to support the cargo cart in a suspended configuration;
wherein the mounting pin extends in the downward orientation further than the tab so that upon said downward motion of at least a portion of the cargo cart with respect to the vehicle hitch adapter, the mounting pin is received partially into the receiving passageway prior to the tab interfacing with the mounting box; and wherein upon a rotational misalignment of the cargo cart with respect to the vehicle hitch adapter in the central vertical axis; the circular aperture allows rotation of the mounting pin within the circular aperture such that the tab is free to translate on the upper surface to align the tab with the tab aperture and allow downward advancement of the tab within the tab aperture along with the portion of downward advancement of the mounting pin within the receiving passageway.

28. The hitch adapter of claim 27, wherein rotation of the cargo cart with respect to the vehicle hitch adapter about the central axis is locked upon full advancement of the tab within the tab aperture.

* * * * *